United States Patent
Krautbauer et al.

(10) Patent No.: US 12,372,117 B2
(45) Date of Patent: Jul. 29, 2025

(54) TORQUE TUBE INTERFACE WEAR GUARD

(71) Applicant: Array Tech, Inc., Albuquerque, NM (US)

(72) Inventors: Kevin Krautbauer, Albuquerque, NM (US); Nathan Schuknecht, Golden, CO (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 18/671,536

(22) Filed: May 22, 2024

(65) Prior Publication Data

US 2024/0392837 A1 Nov. 28, 2024

Related U.S. Application Data

(60) Provisional application No. 63/504,340, filed on May 25, 2023.

(51) Int. Cl.
| | |
|---|---|
| *F16C 35/02* | (2006.01) |
| *F24S 30/425* | (2018.01) |
| *H02S 20/32* | (2014.01) |
| *F24S 30/00* | (2018.01) |

(52) U.S. Cl.
CPC ............ *F16C 35/02* (2013.01); *F24S 30/425* (2018.05); *H02S 20/32* (2014.12); *F24S 2030/15* (2018.05)

(58) Field of Classification Search
CPC ..... H02S 20/32; F24S 30/425; F24S 2030/15; F16C 35/02; F16M 11/10
USPC .......................................................... 248/55
See application file for complete search history.

(56) References Cited

U.S. PATENT DOCUMENTS

| | | | | |
|---|---|---|---|---|
| 10,944,354 | B2 * | 3/2021 | Ballentine | H02S 30/10 |
| 11,976,687 | B2 * | 5/2024 | Sasidharan | H02S 20/10 |
| 2005/0205722 | A1 * | 9/2005 | Krueger | F16L 3/1215 |
| | | | | 248/62 |
| 2019/0068112 | A1 | 2/2019 | Gnanapa | |
| 2020/0052643 | A1 * | 2/2020 | Ballentine | F16M 11/10 |
| 2020/0076357 | A1 * | 3/2020 | Cherukupalli | F24S 25/20 |
| 2021/0194418 | A1 * | 6/2021 | Ballentine | H02S 20/32 |
| 2022/0052636 | A1 * | 2/2022 | Au | F24S 30/425 |
| 2022/0057113 | A1 * | 2/2022 | Sasidharan | F16C 33/201 |
| 2022/0103116 | A1 * | 3/2022 | McPheeters | F24S 30/425 |
| 2022/0107117 | A1 | 4/2022 | Delgado-Nanez | |
| 2023/0141013 | A1 * | 5/2023 | Plioska | F24S 30/425 |
| | | | | 136/246 |

OTHER PUBLICATIONS

European Patent Office; International Search Report and Written Opinion issued in PCT/US2024/030591 dated Sep. 24, 2024; 14 pages.

* cited by examiner

*Primary Examiner* — Christopher Garft
(74) *Attorney, Agent, or Firm* — MASCHOFF BRENNAN

(57) ABSTRACT

Exemplary embodiments of the present disclosure address problems experienced in conventional solar panel tracking systems, including problems associated with wear and damage that can be caused at load bearing interfaces between a bearing and a bearing housing. Embodiments disclosed herein address this issue by positioning a wear guard at the interface between the bearing and the bearing housing. The wear guard may include a smooth controlled surface that minimizes damage between the bearing and the bearing housing.

12 Claims, 34 Drawing Sheets

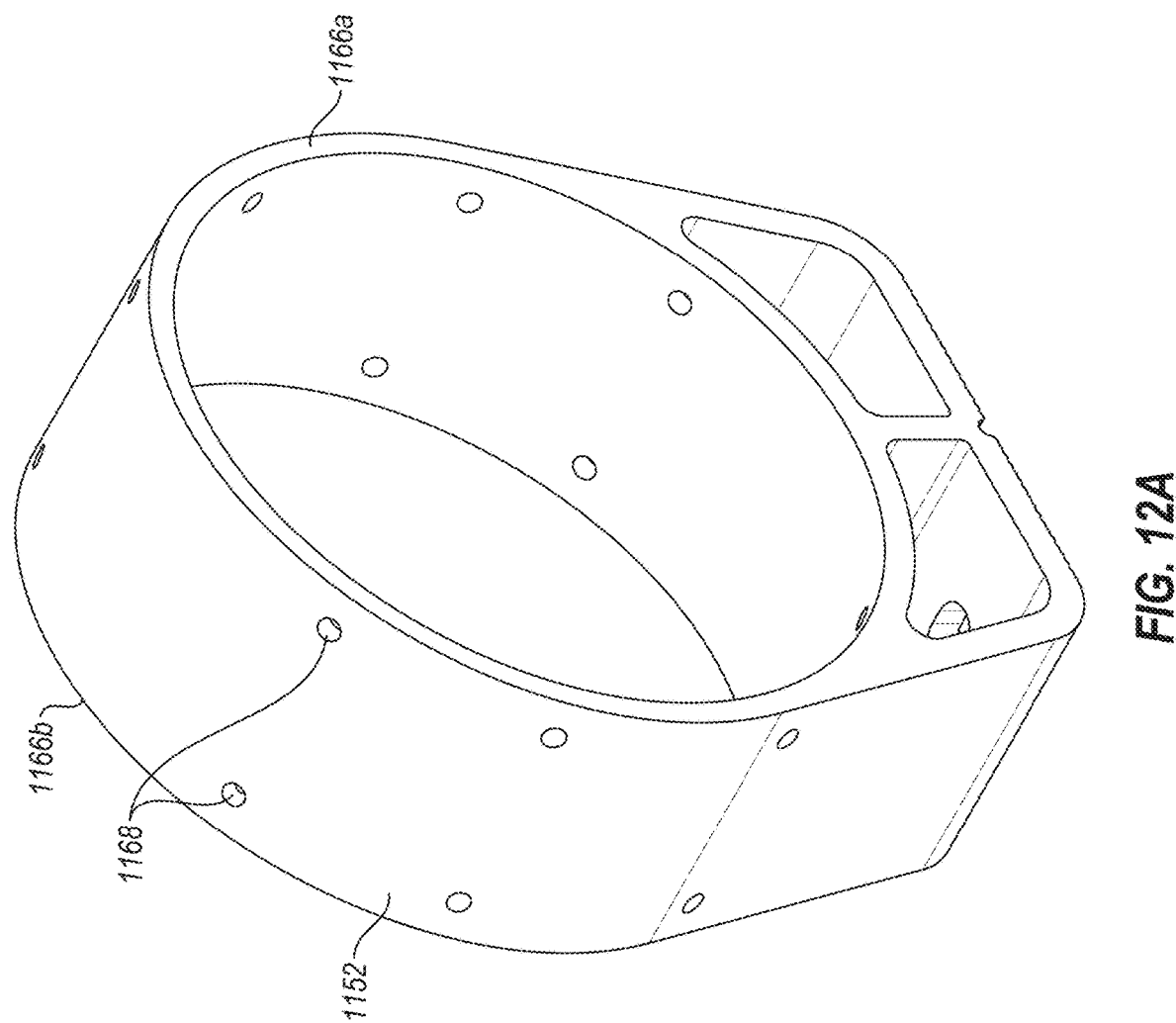

TORQUE TUBE INTERFACE WEAR GUARD

CROSS-REFERENCE TO RELATED APPLICATION

This application claims the benefit of U.S. Patent Application Ser. No. 63/504,340, filed on May 25, 2023, which is incorporated herein by reference in its entirety.

TECHNICAL FIELD

The present disclosure relates to wear guards that are configured to protect against wear and damage that may occur between two load bearing surfaces in torque tube interfaces.

BACKGROUND

Photovoltaic (PV) modules in solar panel systems are mounted on one or more torque tubes, which are attached to a support structure, or pile. The PV modules are often mounted in rows having solar trackers that direct an orientation of the PV modules such that the angle of the PV modules with respect to the support structure changes throughout the day. Solar tracking systems, or systems that allow the angle of the PV module with respect to the support structure to change, enables the PV module to track the location of the sun and maximize efficiency. Often, a large number of PV modules are mounted to a single torque tube, which is secured to a pile or other support structure, through one or more torque tube interfaces. Torque tube interfaces often include both a bearing and bearing housing. The bearings are often configured to rotate with the torque tube within the bearing housing but are prevented from moving axially relative to the bearing housing.

PV modules are heavy, creating a significant amount of axial loading in a direction of a torque tube between surfaces of a bearing and a bearing housing. This is especially true if there are a large number of PV modules connected to a single torque tube and/or if the system is installed on a slope. Wear and damage can occur to one or both of the bearing and bearing housing at an interface where this axial loading is concentrated. In systems where the angle of a PV module can change to track the location of the sun, this wear and damage can be amplified and accelerated by the rubbing and friction caused by the rotation of the bearing relative to the bearing housing.

In addition to the weight attached to a torque tube and the rotation between a bearing and a bearing housing, there are many additional factors that can accelerate the rate of wear and damage caused at these interfaces. For example, environmental factors such as extreme temperatures, seismic activity, rain, and wind that may introduce dust, dirt, or other debris between these load bearing surfaces may further accelerate the wear and damage that can occur. Over time, one or both of the bearing and/or bearing housing surfaces at these at these interfaces can be damaged and need to be repaired and/or replaced.

Lateral loading, or loading in a direction that is generally orthogonal to the axial loading may also case damage and wear between an outer surface of a bearing and an inner surface of a bearing housing. This lateral loading may be caused by bends or curves in the torque tube, which may occur if the system is installed on an uneven surface, such as a hill. Environmental factors such as wind and seismic activities may also cause lateral loading between a bearing and a bearing housing.

Accordingly, there is a need for an improved torque tube interface that prevents or reduces the damage that can be caused at load bearing interfaces between a bearing and a bearing housing.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address problems experienced in conventional solar panel tracking systems, including problems associated with wear and damage that can be caused at load bearing interfaces between a bearing and a bearing housing.

Embodiments disclosed herein address this issue by providing torque tube interfaces that include one or more wear guards. These wear guards may be positioned at the interface(s) between the bearing and the bearing housing where axial and/or lateral loading between the bearing and the bearing housing is concentrated. The wear guards may include smooth controlled surfaces that minimize damage between the bearing and the bearing housing at these interfaces. In some embodiments the wear guards may be coupled to a bearing housing. In other embodiments the wear guards may be coupled to a rotating bearing. In some embodiments, a torque tube interface may include a single wear guard having multiple surfaces that are configured to be positioned at multiple interfaces between a bearing and a bearing housing. In other embodiments, multiple wear guards may be included in a single torque tube interface.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the accompanying drawings in which:

FIGS. 12A-12D illustrate the torque tube interface shown in FIG. 11, and individual components thereof, including the example wear guard in both an installed and uninstalled state.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
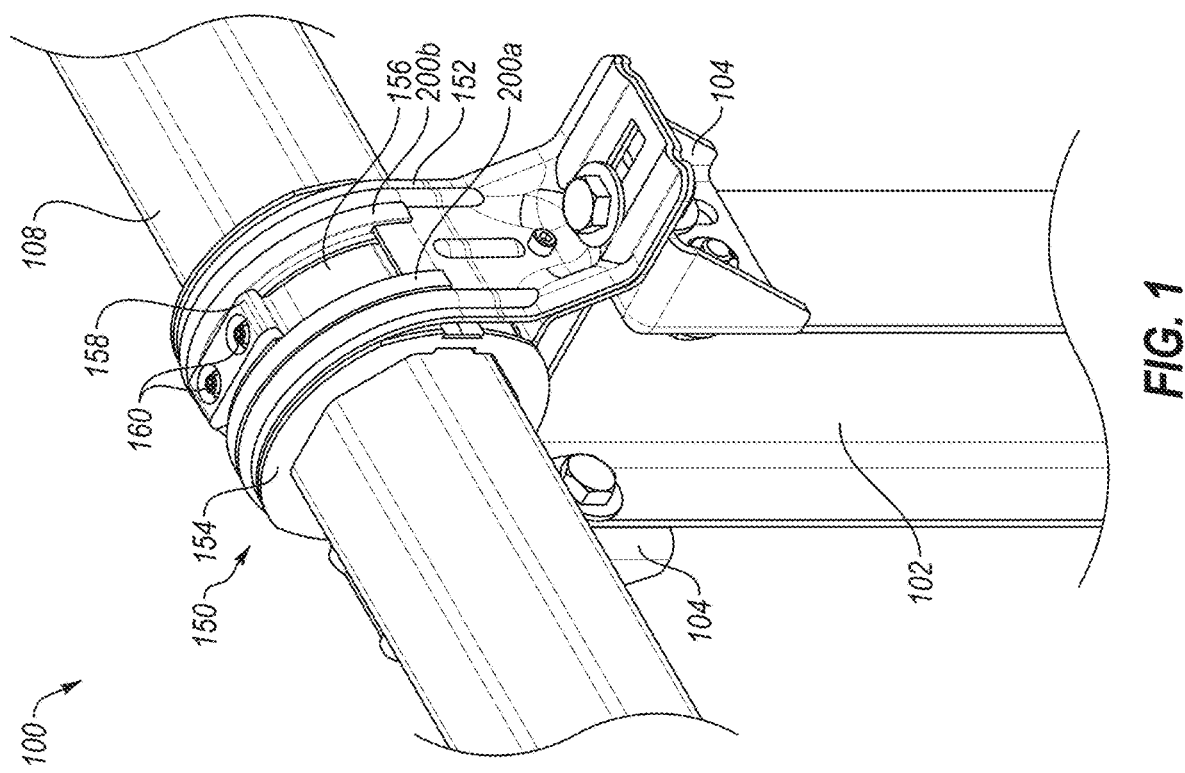
FIG. 1 illustrates a solar tracking system that includes an example wear guards according to the present disclosure.

FIG. 1 illustrates a solar tracking system 100 that includes an example of a wear guard according to the present disclosure. The system 100 includes a support structure 102, brackets 104, a torque tube interface 150, and a torque tube 108. As shown in system 100, the brackets 104 may be secured to the support structure 102, the torque tube interface 150 may be secured to the brackets 104, and the torque tube 108 may be secured to the torque tube interface 150. One or more PV modules (not shown) may be secured to the torque tube 108.

The torque tube interface 150 may include a bearing housing 152 and a rotating bearing 154. The bearing housing 152 can be manufactured from any suitable material, including but not limited to metal, such as aluminum or steel, plastic, a composite, or combinations of different materials. In some embodiments, sheets of pre-treated metal, such as galvanized steel, may be used which may allow for more robust components and/or greater flexibility in manufacturing and cost savings in manufacturing. Additionally or alternatively, such a material may allow for low-friction coatings to be applied to the steel prior to the forming process, thereby reducing cost.

In some embodiments, the rotating bearing 154 can be manufactured from any suitable material, including but not limited to metal, such as aluminum or steel, plastic, a composite, or combinations of different materials. The bearing housing 152 may be coupled to the rotating bearing 154 in a way that allows the rotating bearing 154 at least some rotational freedom within the bearing housing 152. The rotating bearing 154 may include a mechanism that limits the amount of this rotational freedom. For example, the rotating bearing 154 may including a limiting mechanism 156, which may include a stop tab 158. Allowing the bearing 154 to rotate within the bearing housing 152 also allows rotational movement of the torque tube 108 relative to the support structure 102. Permitting rotation of the torque tube 108 within the bearing housing 152 allows the PV module(s) that are attached to the torque tube 108 to rotate with the torque tube 108 in order to track the position of the Sun as it moves across the sky.

While some rotational movement of the bearing 154 may be permitted within the bearing housing 152, axial movement—or movement by the bearing 154 in the direction of the torque tube 108—may be substantially restricted. In some embodiments, to restrict this axial movement, contact surfaces or interfaces may exist between the bearing housing and the bearing. These interfaces may allow for rotational movement between the bearing and bearing housing, but substantially prevent any axial movement.

In addition, the rotating bearing 154 may be coupled to the torque tube 108 to prevent the torque tube from slipping within the bearing 154. Any number of different mechanisms, including screws, bolts, clamps, bands etc. may be used to fix a bearing to a torque tube. In the system 100, a pair of clamping screws 160 extend through a portion of the rotating bearing 154 and apply pressure to the torque tube 108, thereby preventing the torque tube 108 from moving axially or slipping within the rotating bearing 154. In the rotating bearing 154, the clamping screws 160 extend through the stop tab 158 of the limiting mechanism 156. However, in other embodiments, clamping screws or another mechanism to prevent a movement of a torque tube within a bearing may be positioned in other locations.

In some embodiments, a plurality of PV modules may be secured to the torque tube 108. As more PV modules are secured to the torque tube 108, the pressure between contact surfaces or interfaces between the bearing housing 152 and the rotating bearing 154 may increase. This is especially true if the torque tube does not lie on a horizontal line. For example, if the torque tube 108 is mounted to support structures on a hill or another surface with a nonlevel grade, a corresponding incline in the torque tube 108 may increase the axial loading at the interface(s) between the bearing housing 152 and the rotating bearing 154. Seismic activity and other environmental factors such as wind may also increase the axial loading at the interface(s) between the bearing housing 152 and the rotating bearing 154.

Lateral loading, or loading in a direction that is generally orthogonal to the axial loading may also cause damage and wear between an outer surface of the rotating bearing 154 and an inner surface of the bearing housing 152. In addition to an increase in axial loading, if the torque tube 108 is mounted to support structures on a hill or another surface with a nonlevel grade, the lateral loading may also increase. Environmental factors such as wind and seismic activities may also cause lateral loading between a bearing and a bearing housing.

This axial and lateral loading may cause damage and wear to the surfaces of one or both of the bearing housing 152 and the rotating bearing 154 at these interfaces. To address this problem and prevent wear and damage, the torque tube interface 150 includes wear guards 200a and 200b that are positioned at interfaces between the bearing housing 152 and the rotating bearing 154.

Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described.

Figure 2A:
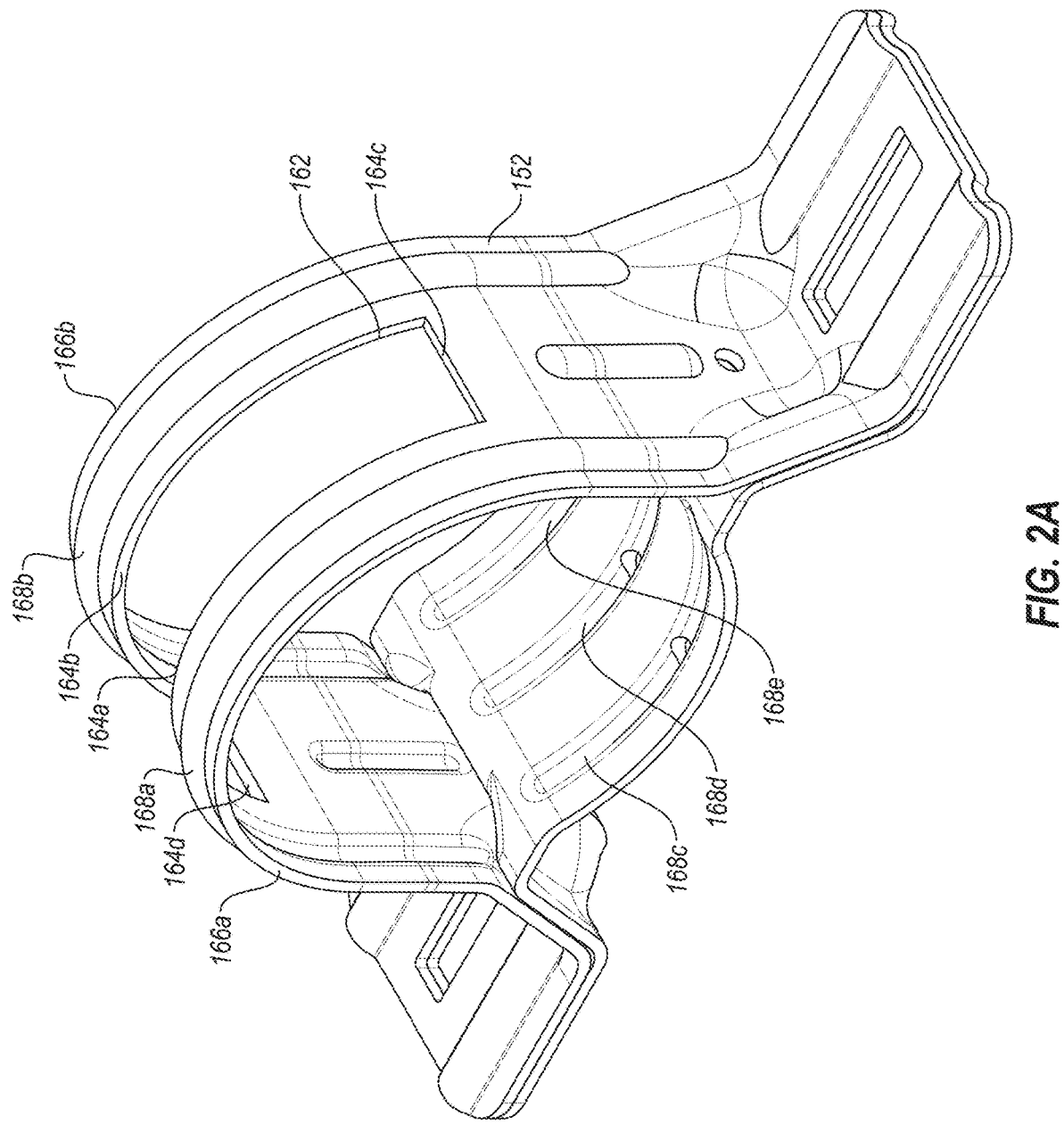
FIGS. 2A-2F illustrate the torque tube interface shown in FIG. 1, and individual components thereof, including the example wear guards in both an installed and uninstalled state.
Figure 2B:
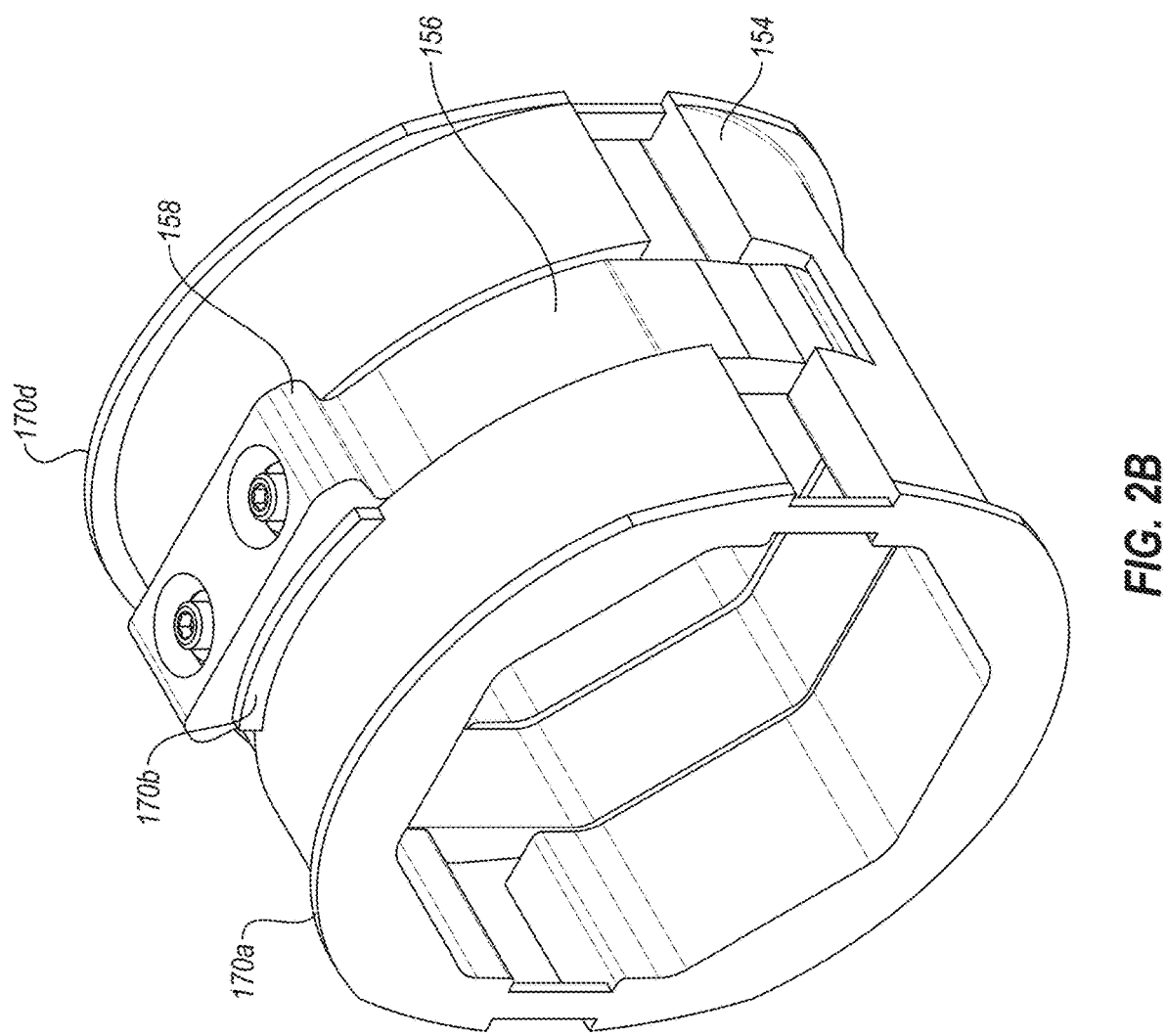
Figure 2C:
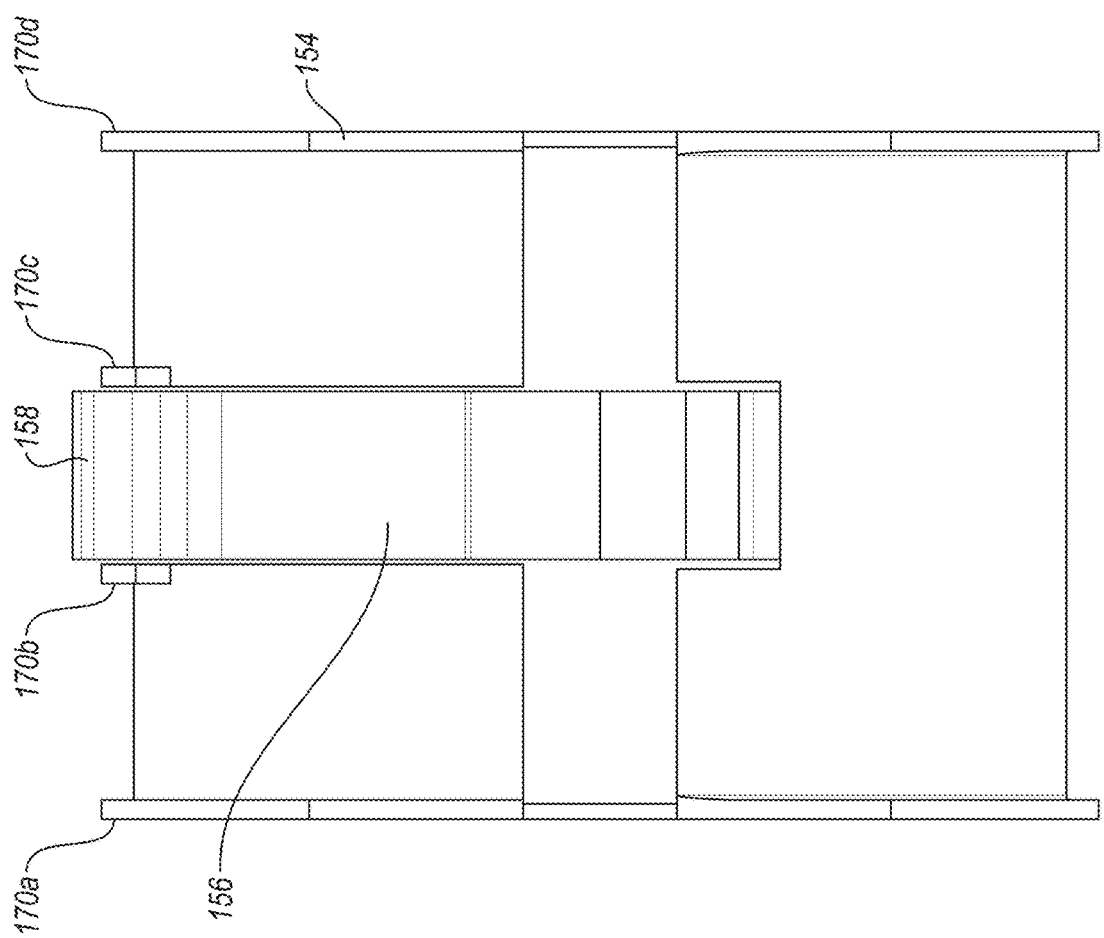
Figure 2D:
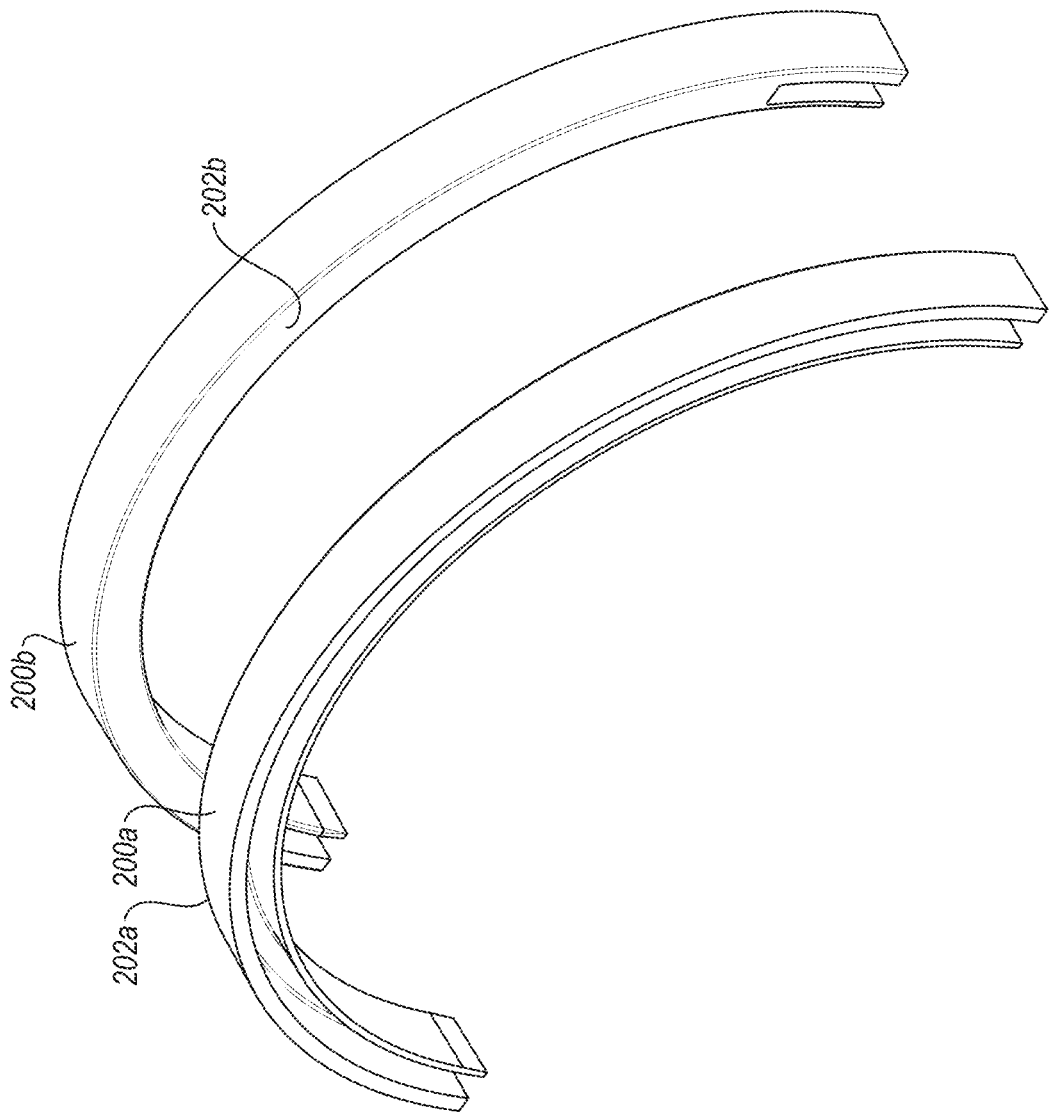
Figure 2E:
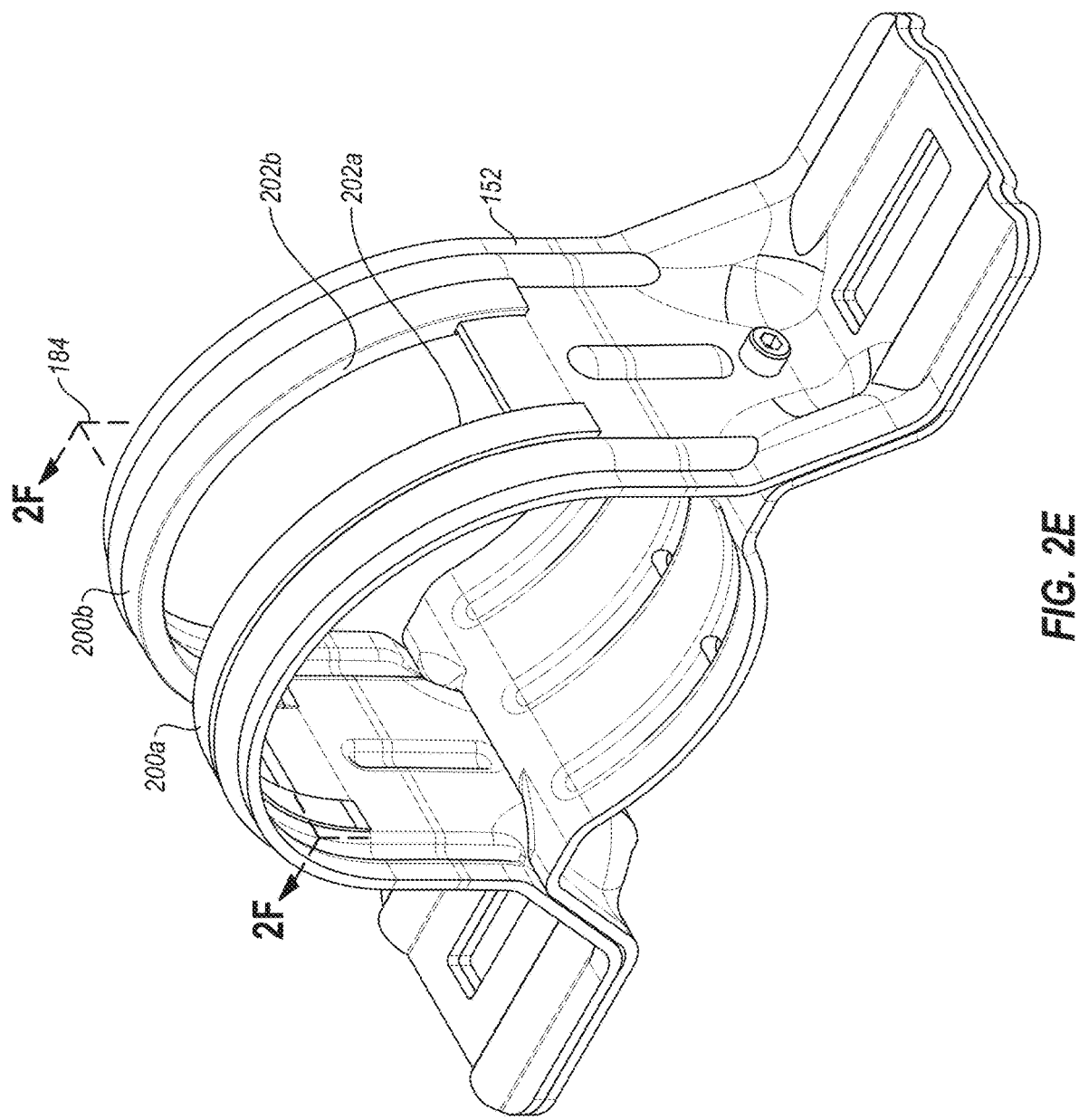
Figure 2F:
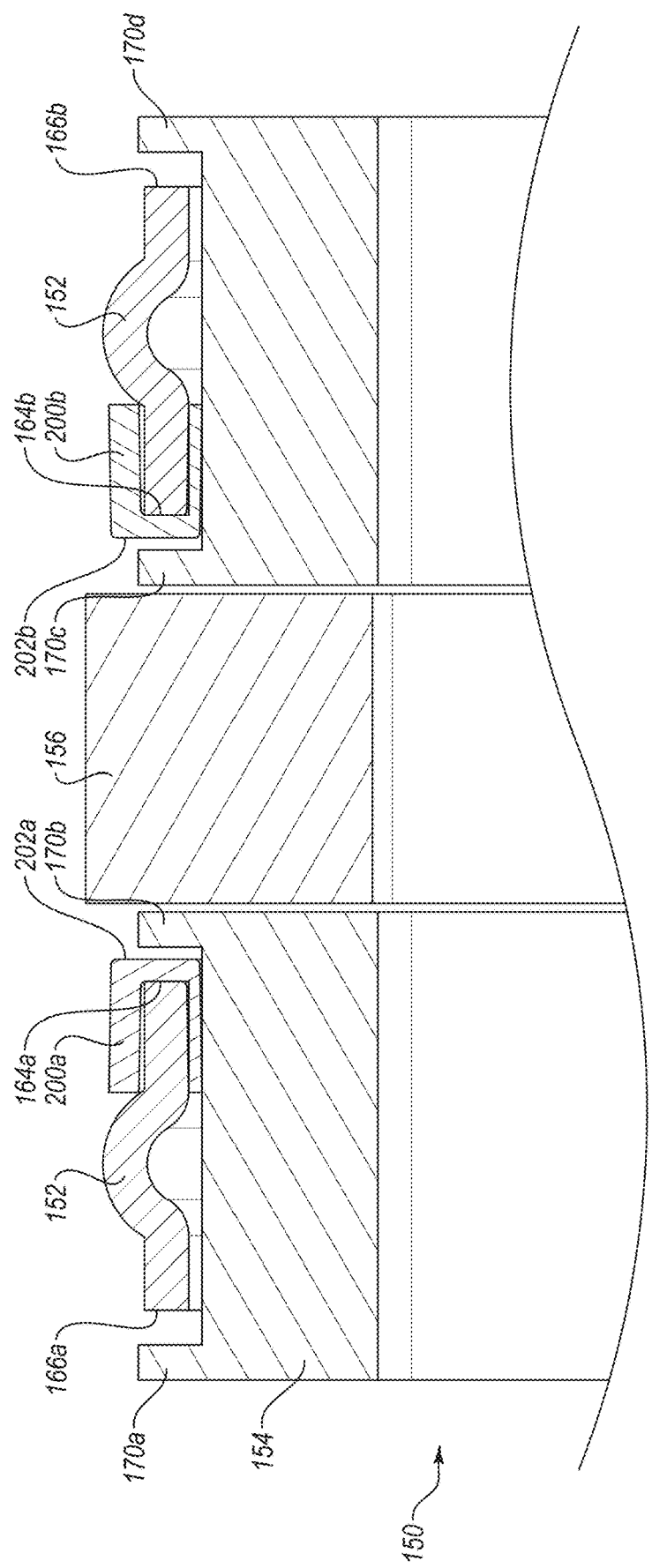

FIGS. 2A-2F illustrate the torque tube interface 150 shown in FIG. 1, and individual components thereof including the wear guards 200a and 200b. Specifically, FIG. 2A illustrates an isometric view of the bearing housing 152, FIG. 2B illustrates an isometric view of the rotating bearing 154, FIG. 2C illustrates a side view of the rotating bearing 154, FIG. 2D illustrates an isometric view of the wear guards 200a and 200b, FIG. 2E illustrates an isometric view of the bearing housing 152 with the wear guards 200a and 200b installed, and FIG. 2F illustrates a side cut away view of a top portion of the torque tube interface 150 with the wear guards 200a and 200b installed.

As can be seen in FIG. 2A, the bearing housing 152 of the torque tube interface 150 includes a slot 162 that is configured to accommodate the stop tab 158 of the limiting mechanism 156. The slot 162 is defined by four terminating edges 164a, 164b, 164c, and 164d in the bearing housing 152. The bearing housing 152 also includes terminating edges 166a and 166b that define the axial sides of the bearing housing 152.

In some embodiments, the edges 164a, 164b, 164c, 164d, 166a, and 166b may be machined edges, stamped edges, molded edges, etc. and may be formed in any number of different ways. For example, the edges 164a, 164b, 164c, 164d, 166a, and 166b may have a sharp, fillet, chamfer, or another type of edge. Regardless of the type of edge or how it is formed, the edges 164a, 164b, 164c, 164d, 166a, and 166b may have sharp corners, burrs, or other features that may, over time, cause damage to an opposing surface. In some embodiments, the surface area of an interface between two components may be too small for the amount of pressure applied and result in a contact load that is too high for the materials. The bearing housing 152 may also include one or more ridges 168a, 168b, 168c, 168d, and 168e that may increase the structural integrity of the bearing housing 152.

FIGS. 2B and 2C illustrate the rotating bearing 154 of torque tube interface 150. The rotating bearing 154 includes the limiting mechanism 156, which includes the stop tab 158. In some embodiments, the limiting mechanism 156 may be constructed from a metal such as aluminum while the other portions of the rotating bearing 154 may be constructed from a plastic or composite material.

The rotating bearing 154 may include a plurality of lip portions 170a, 170b, 170c, and 170d. In some embodiments, the lip portions 170a and 170d may be configured to surround all or part of the sides of the rotating bearing 154. The lip portions 170a, 170b, 170c, and 170d may be configured to interface with one or more of the edges 164a, 164b, 164c, 164d, 166a, and 166b of the bearing housing 152 to prevent axial movement of the rotating bearing 154 within the bearing housing 152. For example, lip portion 170a of the rotating bearing 154 is configured to interface with the edge 166a of the bearing housing 152. Lip portion 170b of the rotating bearing 154 is configured to interface with the edge 164a of the bearing housing 152. Lip portion 170c of the rotating bearing 154 is configured to interface with the edge 164b of the bearing housing 152. Lip portion 170d of the rotating bearing 154 is configured to interface with the edge 166b of the bearing housing 152.

FIG. 2D illustrates the wear guards 200a and 200b of torque tube interface 150. Similar to the bearing housing 152 and rotating bearing 154, the wear guards 200a and 200b may be constructed from any suitable material including but not limited to metal, plastic, a composite, or some combination of materials. One or more of the outer surfaces of the wear guards 200a and 200b may be smooth controlled surfaces that are configured to minimize wear with opposing surfaces. For example, the wear guards 200a and 200b include side portions 202a and 202b that have smooth controlled surfaces that are configured to minimize wear with opposing surfaces. The wear guards 200a and 200b are configured to be positioned between one or more of the interfaces between the bearing housing 152 and the rotating bearing 154. For example, as can be seen in FIG. 2E, the wear guard 200a is attached to the edge 164a of the bearing housing 152. The wear guard 200b is attached to the edge 164b of the bearing housing 152.

In some embodiments, the wear guards 200a and 200b may remain stationary relative to the bearing housing 152. When the rotating bearing 154 is positioned within the bearing housing 152, the lip portions 170b and 170c do not directly interface with the edges 164a and 164b regardless of the rotational configuration of the rotating bearing 154 within the bearing housing 152. Rather, the lip portions 170b and 170c interface with and rub against the side portions 202a and 202b, respectively, of the wear guards 200a and 200b. By eliminating a direct interface between the lip portions 170b and 170c and the edges 164a and 164b, wear and damage that may be caused by the edges 164a and 164b to the lip portions 170b and 170c or by the lip portions 170b and 170c to the edges 164a and 164b can be avoided or reduced.

FIG. 2F illustrates a cross sectional view of the torque tube interface 150 along a plane 184 shown in FIG. 2E with the wear guards 200a and 200b installed. The wear guards 200a and 200b have cross sectional C shapes, which are configured to fit on portions of outer surfaces and inner surfaces of the bearing housing 152 that surround the edges 164a and 164b. Any mechanism can be used to attach wear guards to bearing housings. In some embodiments, the wear guards 200a and 200b may be adhered to the bearing housing 152 using an epoxy or glue. In other embodiments, friction between the bearing housing 152 and bearing 154 may maintain the wear guards 200a and 200b in place. As can be seen in FIG. 2F, the side portion 202a of the wear guard 200a is positioned between the bearing housing 152 and rotating bearing 154 such that the lip portion 170b of rotating bearing 154 is protected from direct contact with the edge 164a of the bearing housing 152. Similarly, the side portion 202b of the wear guard 200b is positioned between the bearing housing 152 and rotating bearing 154 such that the lip portion 170c of rotating bearing 154 is protected from direct contact with the edge 164b of the bearing housing 152.

Any number of different wear guards may be positioned at an interface between the bearing housing 152 and the rotating bearing 154. For example, FIGS. 4A and 4b and FIGS. 3A-3C illustrate additional embodiments of wear guards that protect one or more lip portions of the rotating bearing 154 from edges of the bearing housing 152.

Figure 3A:
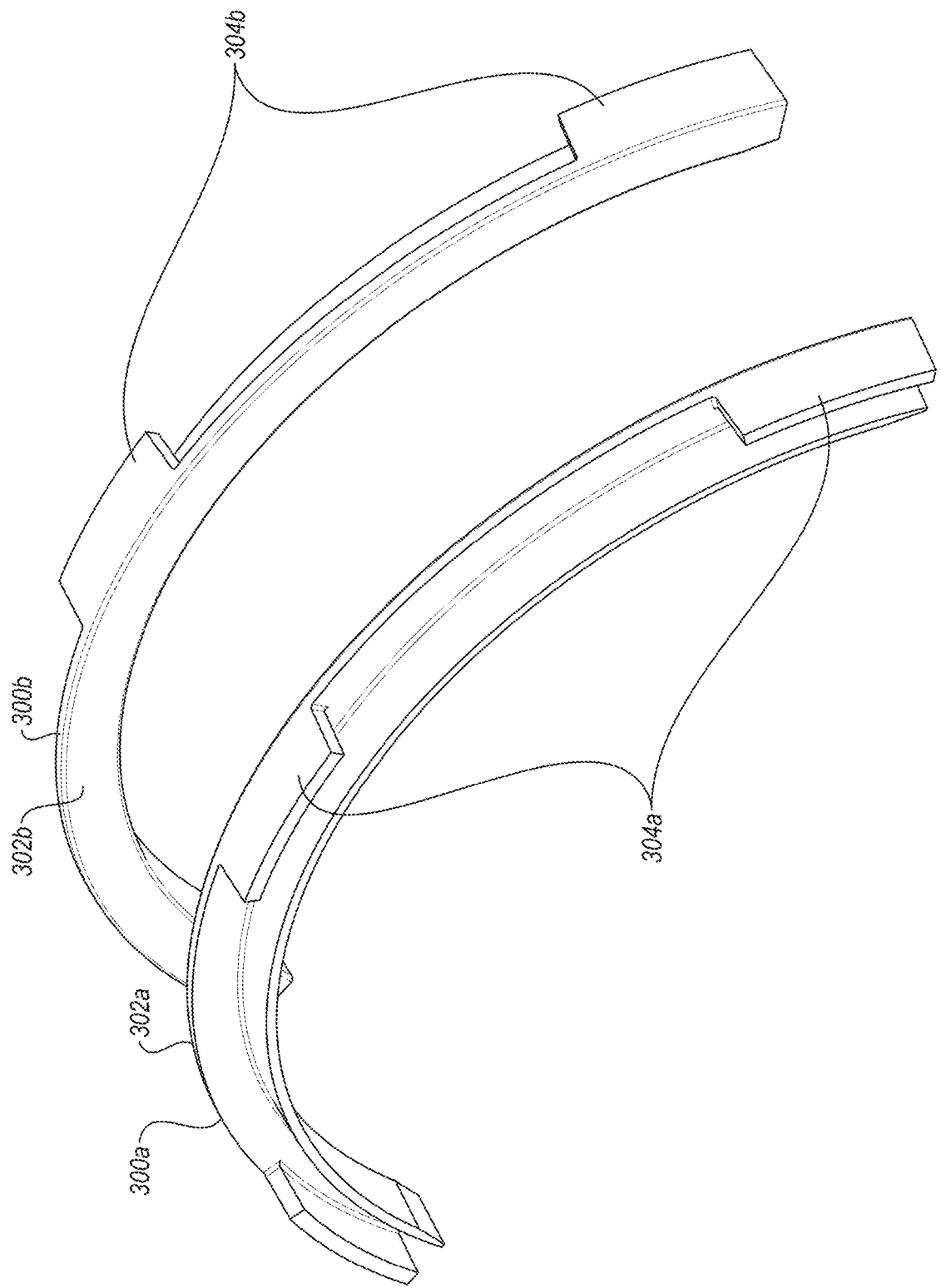
FIGS. 3A and 3B illustrate another example of wear guards according to the present disclosure in both an installed and uninstalled state.
Figure 3B:
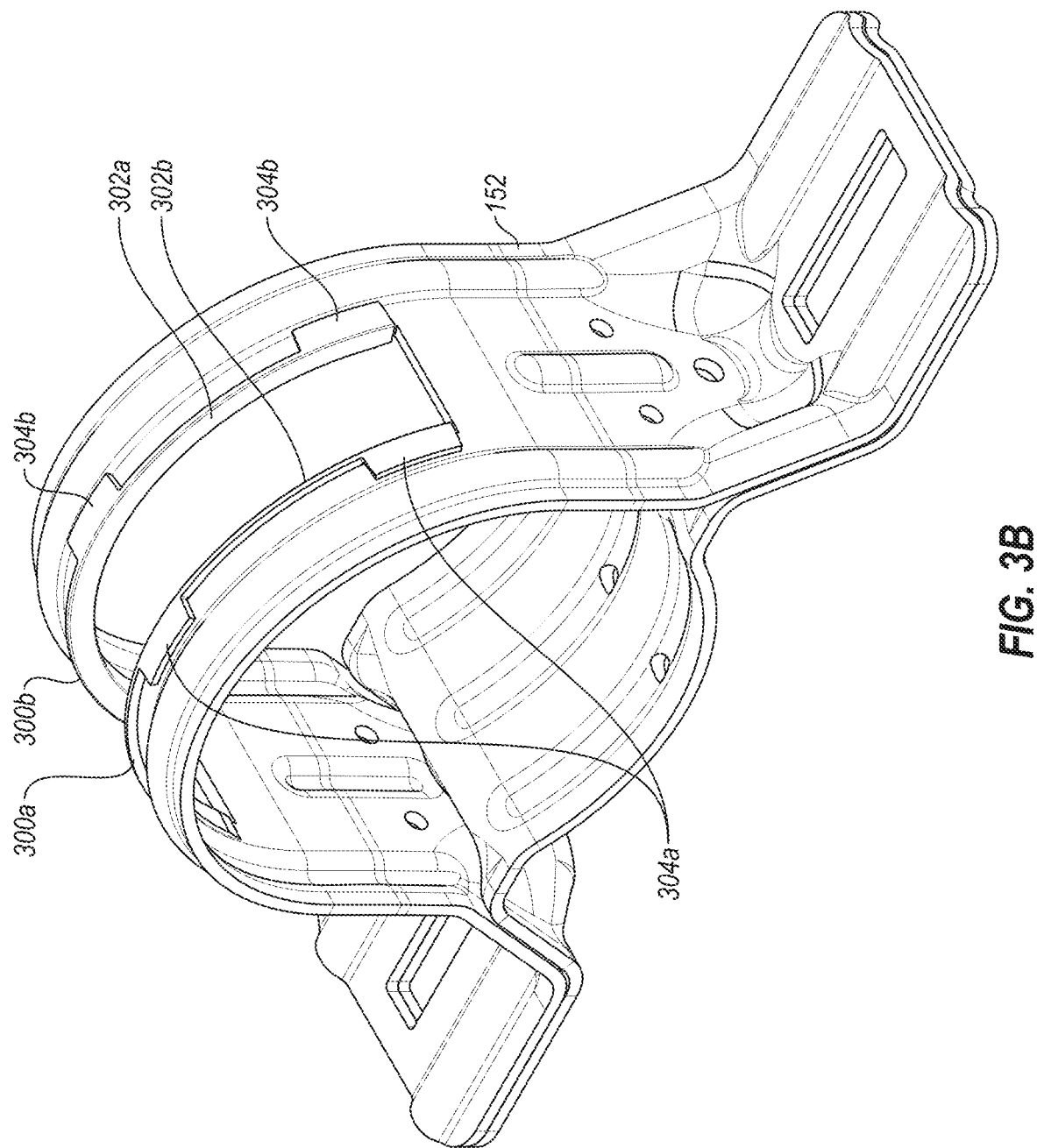

Specifically, FIG. 3A illustrates an isometric view of wear guards 300a and 300b and FIG. 3B illustrates an isometric view of the bearing housing 152 with the wear guards 300a and 300b installed. One or more of the outer surfaces of the wear guards 300a and 300b may be smooth controlled surfaces that are configured to minimize wear with opposing surfaces. For example, the wear guards 300a and 300b include side portions 302a and 302b that have smooth controlled surfaces that are configured to minimize wear with opposing surfaces. The wear guards 300a and 300b are configured to be positioned between one or more of the interfaces between the bearing housing 152 and the rotating bearing 154. For example, as can be seen in FIG. 3B, the wear guard 300a is attached to the edge 164a of the bearing housing 152. The wear guard 300b is attached to the edge 164b of the bearing housing 152. The wear guards 300a and 300b also include tabs 304a and 304b that extend intermittently from the side portions 302a and 302b to cover a top surface of the bearing housing 152.

In some embodiments, the wear guards 300a and 300b may remain stationary relative to the bearing housing 152. When the rotating bearing 154 is positioned within the bearing housing 152, the lip portions 170b and 170c do not directly interface with the edges 164a and 164b, regardless of the rotational configuration of the rotating bearing 154 within the bearing housing 152. Rather, the lip portions 170b and 170c interface with and rub against the side portions 302a and 302b, respectively, of the wear guards 300a and 300b. By eliminating a direct interface between the lip portions 170b and 170c with the edges 164a and 164b, wear and damage that may be caused by the edges 164a and 164b to the lip portions 170b and 170c or by the lip portions 170b and 170c to the edges 164a and 164b can be avoided or reduced.

Figure 4A:
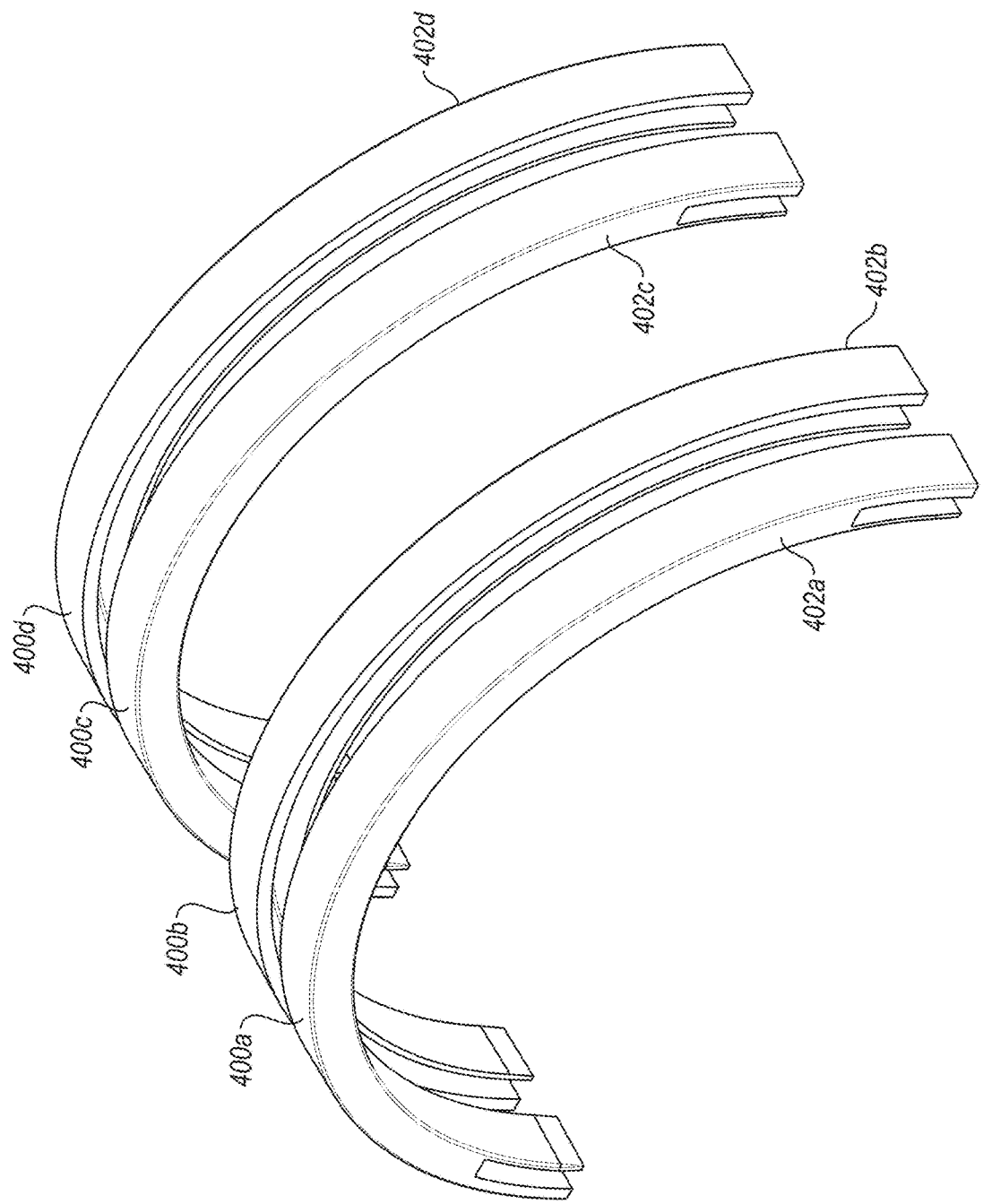
FIGS. 4A-4C illustrate another example of wear guards according to the present disclosure in both an installed and uninstalled state.
Figure 4B:
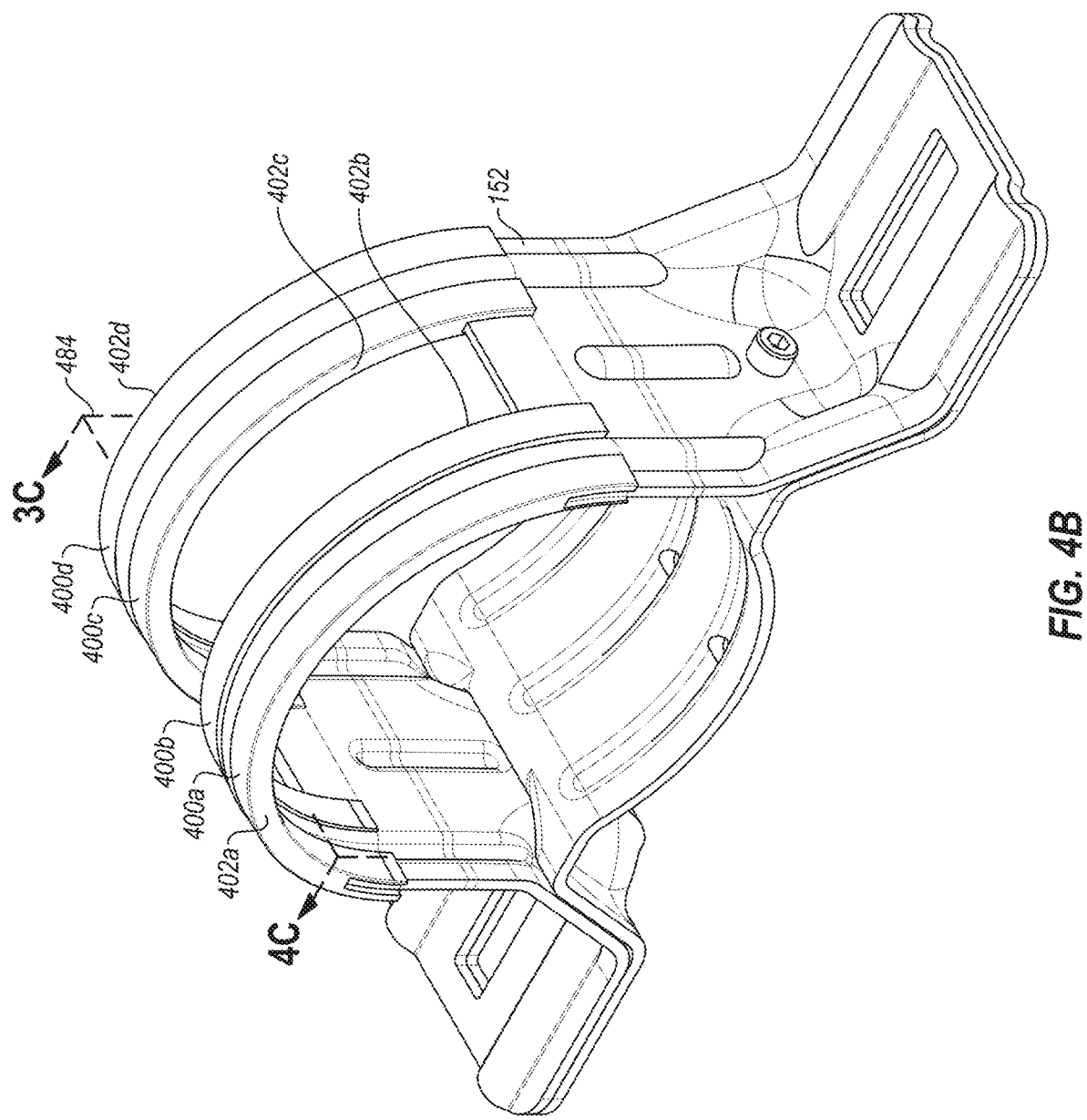
Figure 4C:
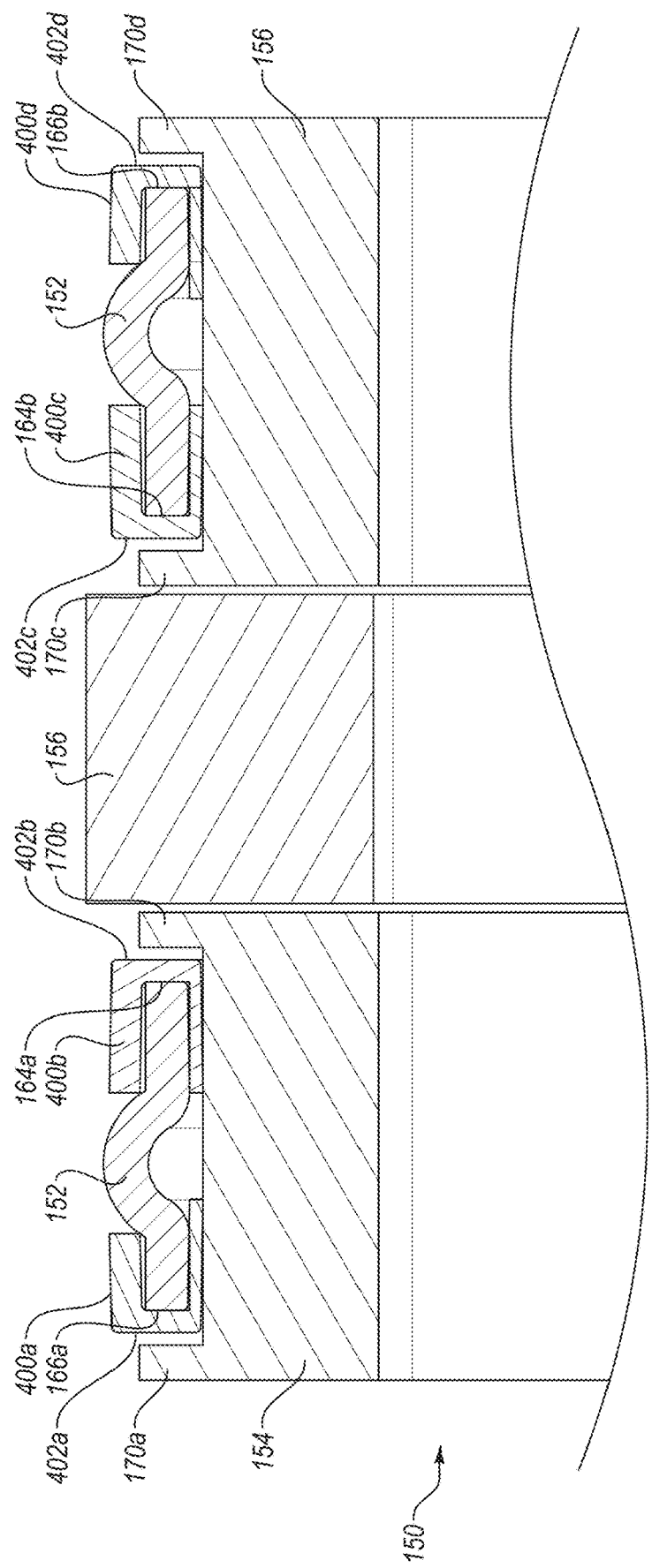

FIG. 4A illustrates an isometric view of wear guards 400a, 400b, 400c, and 400d, FIG. 4B illustrates an isometric view of the bearing housing 152 with the wear guards 400a, 400b, 400c, and 400d installed, and FIG. 4C illustrates a side cut away view of a top portion of the torque tube interface 150 with the wear guards 400a, 400b, 400c, and 400d installed.

One or more of the outer surfaces of the wear guards 400a, 400b, 400c, and 400d may be smooth controlled surfaces that are configured to minimize wear with opposing surfaces. For example, the wear guards 400a, 400b, 400c, and 400d include side portions 402a, 402b, 402c, and 402d that have smooth controlled surfaces that are configured to minimize wear with opposing surfaces. The wear guards 400a, 400b, 400c, and 400d are configured to be positioned between one or more of the interfaces between the bearing housing 152 and the rotating bearing 154. For example, as can be seen in FIG. 4B, the wear guard 400a is attached to a portion of the edge 166a of the bearing housing 152. The wear guard 400b is attached to the edge 164a of the bearing housing 152. The wear guard 400c is attached to the edge 164b of the bearing housing 152. The wear guard 400d is attached to the edge 166b of the bearing housing 152.

In some embodiments, the wear guards 400a, 400b, 400c, and 400d may remain stationary relative to the bearing housing 152. When the rotating bearing 154 is positioned within the bearing housing 152, the lip portions 170a, 170b, 170c, and 170d do not directly interface with the edges 164a, 164b, 166a, and 166b, regardless of the rotational configuration of the rotating bearing 154 within the bearing housing 152. Rather, the lip portions 170a, 170b, 170c and 170d interface with and rub against the side portions 402a, 402b, 402c, and 402d, respectively, of the wear guards 400a, 400b, 400c, and 400d. By eliminating a direct interface between the lip portions 170a, 170b, 170c, and 170d and the edges 166a, 164a, 164b, and 166b, wear and damage that may be caused by the edges 166a, 164a, 164b, and 166b to the lip portions 170a, 170b, 170c, and 170d or by the lip portions 170a, 170b, 170c, and 170d to the edges 166a, 164a, 164b, and 166b can be avoided or reduced.

FIG. 4C illustrates a cross sectional view of the torque tube interface 150 along a plane 484 shown in FIG. 4B with the wear guards 400a, 400b, 400c, and 400d installed. The wear guards 400a, 400b, 400c, and 400d have cross sectional C shapes, which are configured to fit on portions of outer surfaces and inner surfaces of the bearing housing 152 that surround the edges 166a, 164a, 164b, and 166b. The wear guards 400a, 400b, 400c, and 400d may be adhered to the bearing housing 152 using an epoxy or glue or another means such as a friction fit. As can be seen in FIG. 4C, the side portion 402a of the wear guard 400a is positioned between the bearing housing 152 and rotating bearing 154 such that the lip portion 170a of rotating bearing 154 is protected from direct contact with the edge 166a of the bearing housing 152. The side portion 402b of the wear guard 400b is positioned between the bearing housing 152 and rotating bearing 154 such that the lip portion 170b of rotating bearing 154 is protected from direct contact with the edge 164a of the bearing housing 152. The side portion 402c of the wear guard 400c is positioned between the bearing housing 152 and rotating bearing 154 such that the lip portion 170c of rotating bearing 154 is protected from direct contact with the edge 164b of the bearing housing 152. The side portion 402d of the wear guard 400d is positioned between the bearing housing 152 and rotating bearing 154 such that the lip portion 170d of rotating bearing 154 is protected from direct contact with the edge 166b of the bearing housing 152.

Figure 5A:
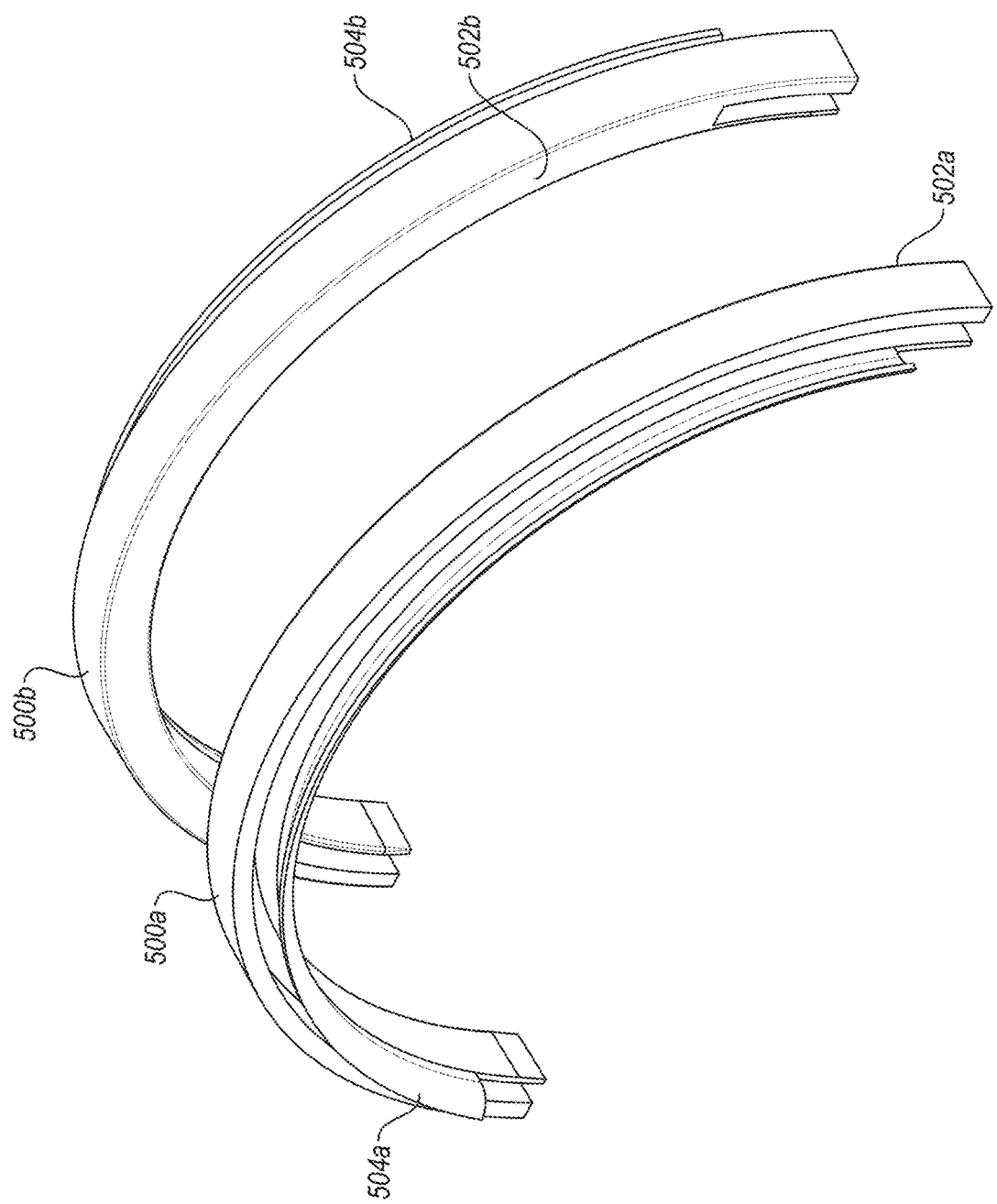
FIGS. 5A-5C illustrate another example of wear guards according to the present disclosure in both an installed and uninstalled state.
Figure 5B:
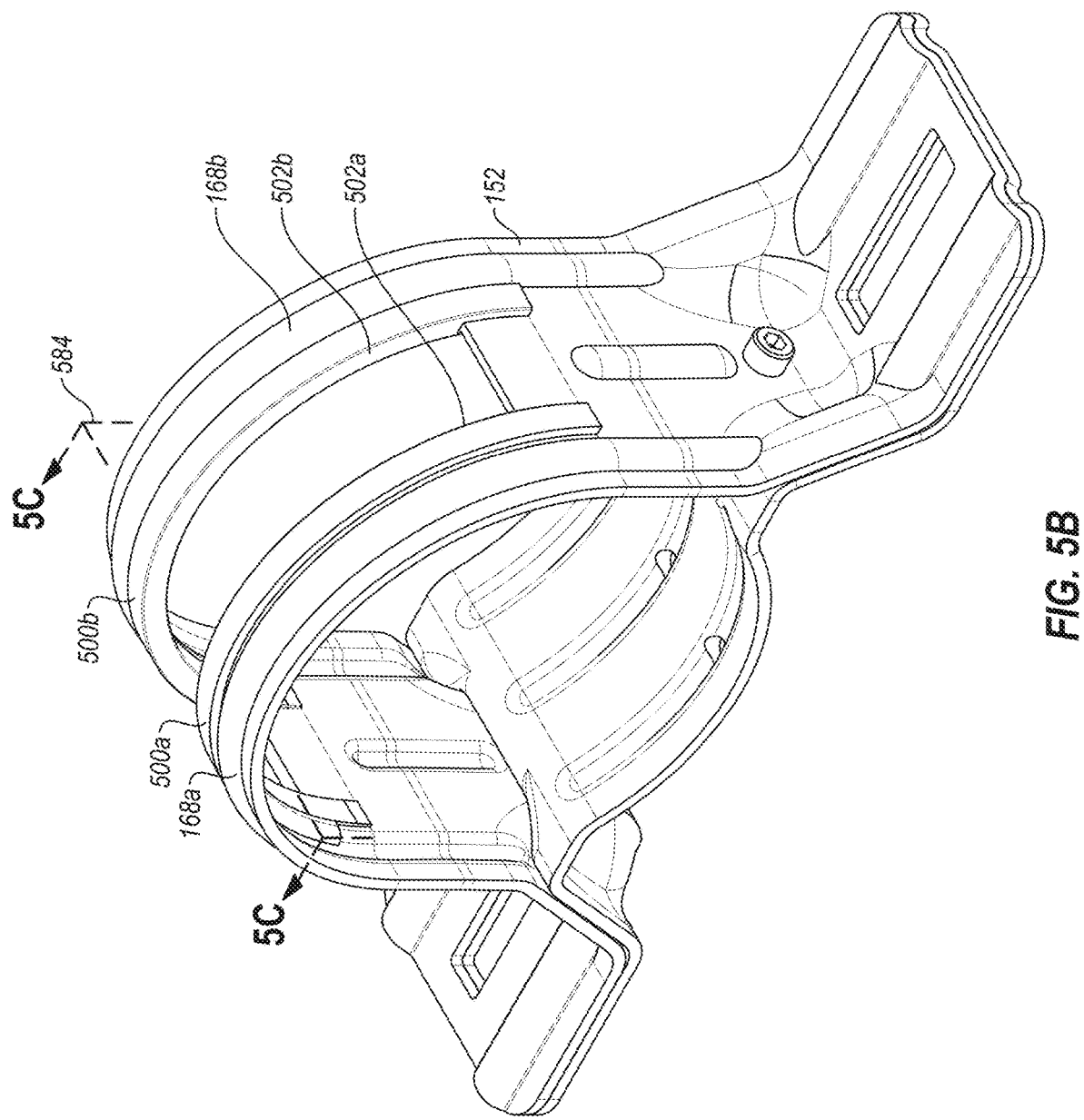
Figure 5C:
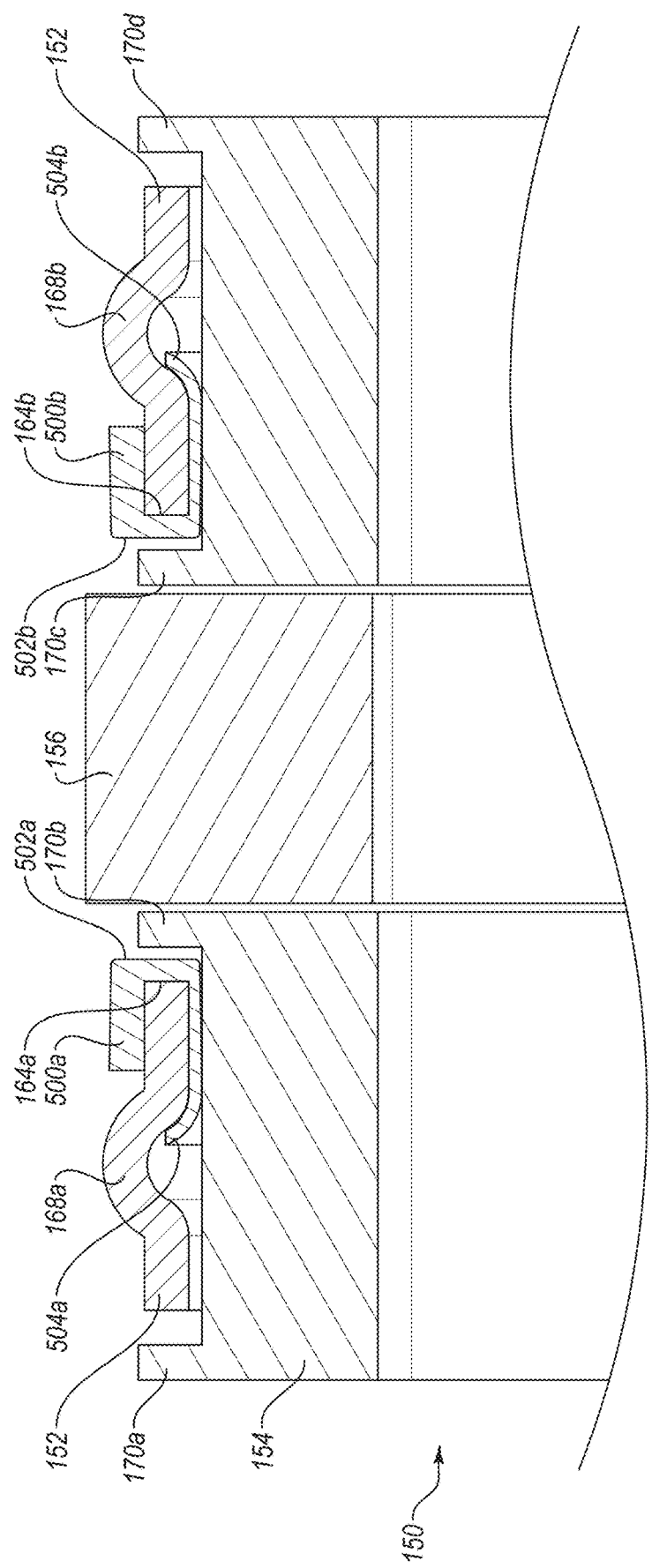

FIGS. 5A-5C illustrate another exemplary embodiment of torque tube interface 150 having wear guards that protect one or more lip portions of the rotating bearing 154 from edges of the bearing housing 152. Specifically, FIG. 5A illustrates an isometric view of wear guards 500a, and 500b, FIG. 5B illustrates an isometric view of the bearing housing 152 with the wear guards 500a and 500b installed, and FIG. 5C illustrates a side cut away view of a top portion of the torque tube interface 150 with the wear guards 500a and 500b installed.

One or more of the outer surfaces of the wear guards 500a and 500b may be smooth controlled surfaces that are configured to minimize wear with opposing surfaces. For example, the wear guards 500a and 500b include side portions 502a and 502b that have smooth controlled surfaces that are configured to minimize wear with opposing surfaces. The wear guards 500a and 500b also include flanges 504a and 504b, which may be used to attach the wear guards 500a and 500b to the bearing housing 152.

The wear guards 500a and 500b are configured to be positioned between one or more of the interfaces between the bearing housing 152 and the rotating bearing 154. For example, as can be seen in FIG. 5B, the wear guard 500a is attached to a portion of the edge 164a of the bearing housing 152. The wear guard 500b is attached to the edge 164b of the bearing housing 152. Flanges 504a and 504b are configured to align with all or part of the structural ridges 168a and 168b in the bearing housing 152.

In some embodiments, the wear guards 500a and 500b may remain stationary relative to the bearing housing 152. When the rotating bearing 154 is positioned within the bearing housing 152, the lip portions 170b and 170c do not directly interface with the edges 164a and 164b, regardless of the rotational configuration of the rotating bearing 154 within the bearing housing 152. Rather, the lip portions 170b and 170c may interface with and rub against the side portions 502a and 502b, respectively, of the wear guards 500a and 500b. By eliminating a direct interface between the lip portions 170b and 170c and the edges 164a and 164b, wear and damage that may be caused by the edges 164a and 164b to the lip portions 170b and 170c or by the lip portions 170b and 170c to the edges 164a and 164b can be avoided or reduced.

FIG. 5C illustrates a cross sectional view of the torque tube interface 150 along a plane 584 shown in FIG. 5B with the wear guards 500a and 500b installed. The wear guards 500a and 500b have cross sectional C shapes, which are configured to fit on portions of top surfaces and bottom surfaces of the bearing housing 152 that surround the edges 164a and 164b. The wear guards 500a and 500b are attached to the bearing housing 152 using a snap or friction attachment. Specifically, as can be seen in FIG. 5C, the flanges 504a and 504b of wear guards 500a and 500b fit under a portion of the structural ridges 168a and 168b. This snap or friction attachment maintains the wear guards 500a and 500b on the bearing housing 152.

In addition, the side portion 502a of the wear guard 500a is positioned between the bearing housing 152 and rotating bearing 154 such that the lip portion 170b of rotating bearing 154 is protected from direct contact with the edge 164a of the bearing housing 152. The side portion 502b of the wear guard 500b is positioned between the bearing housing 152 and rotating bearing 154 such that the lip portion 170c of rotating bearing 154 is protected from direct contact with the edge 164b of the bearing housing 152.

Figure 6A:
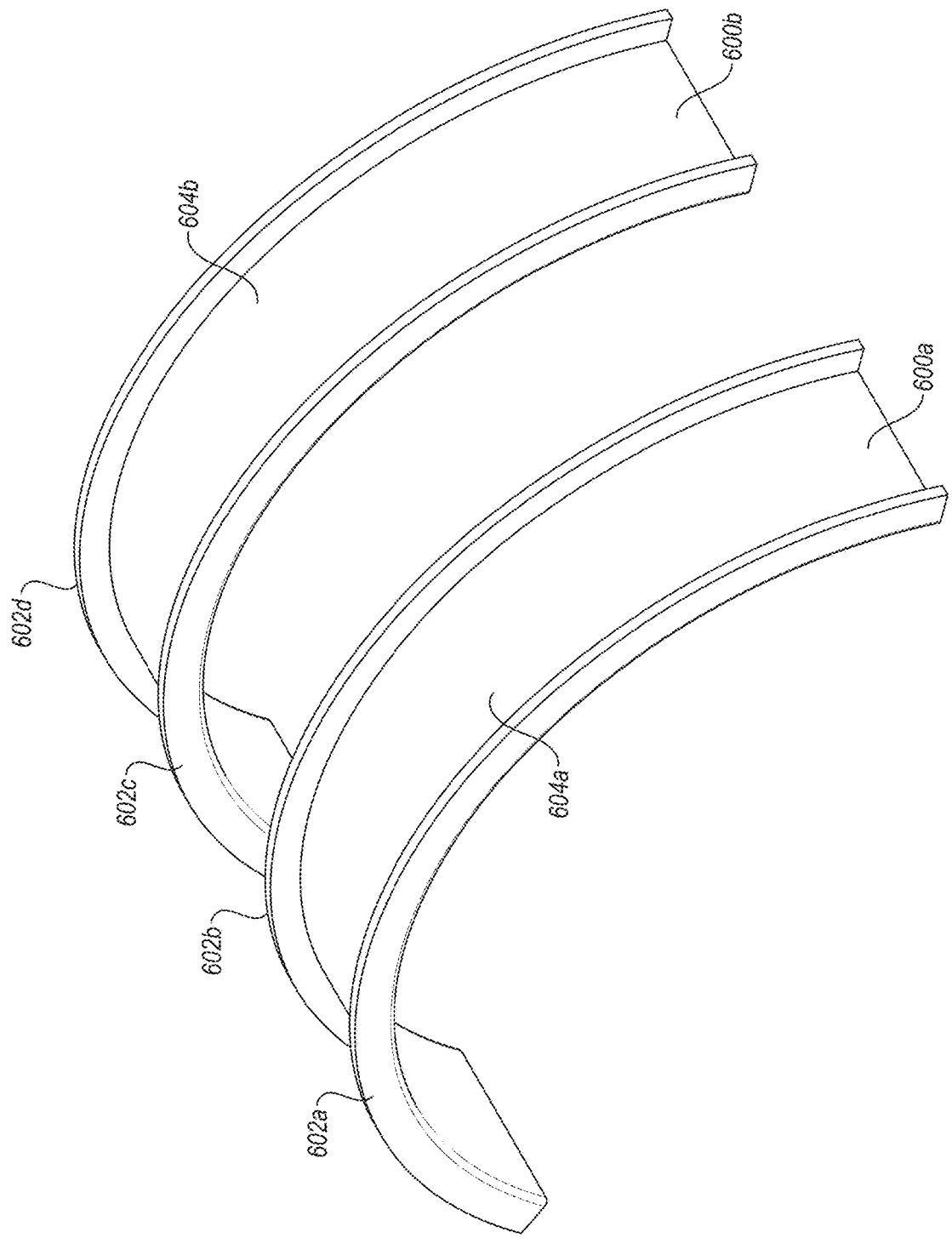
FIGS. 6A-6C illustrate various views of an exemplary torque tube interface having another exemplary wear guard.
Figure 6B:
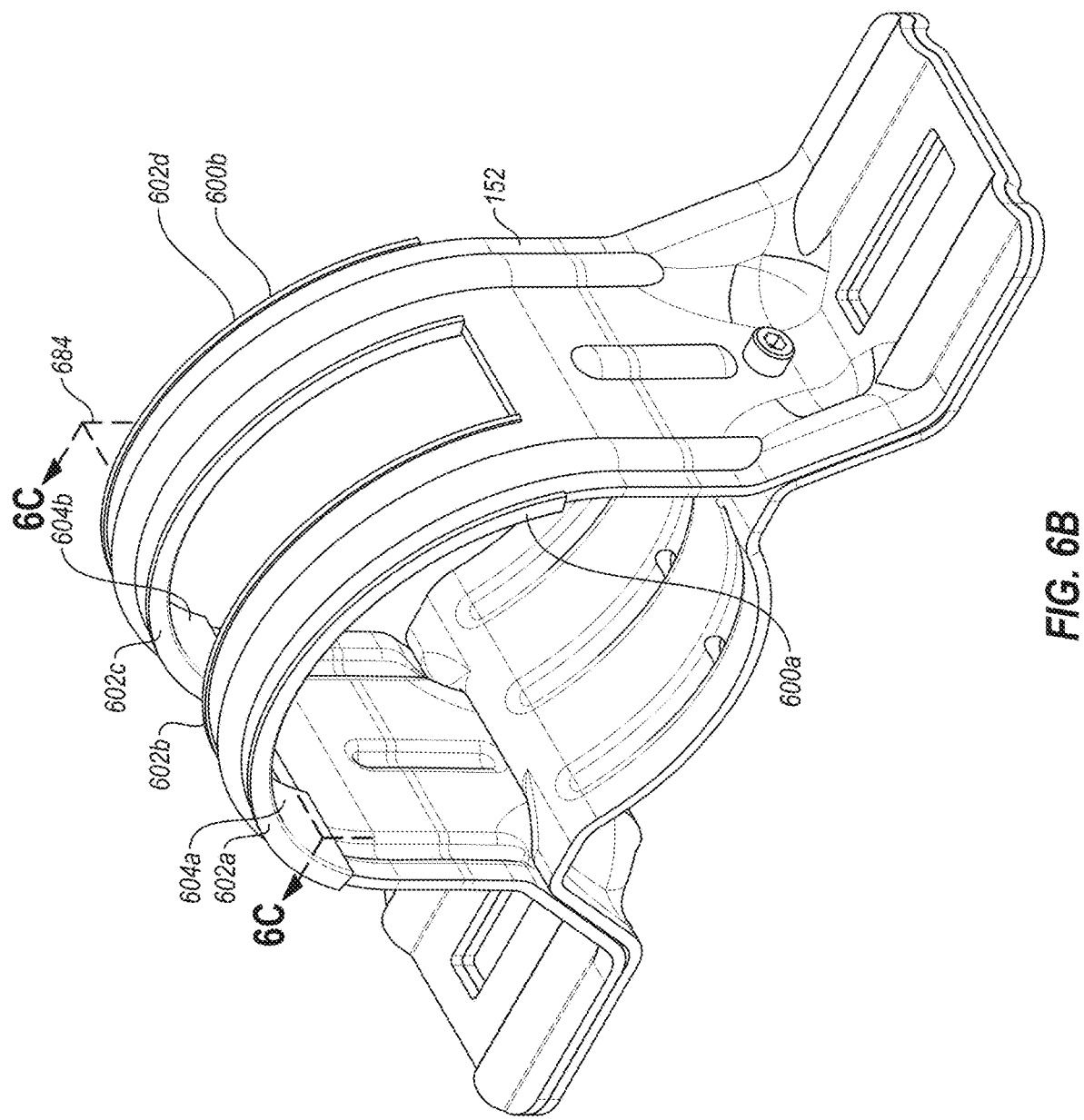
Figure 6C:
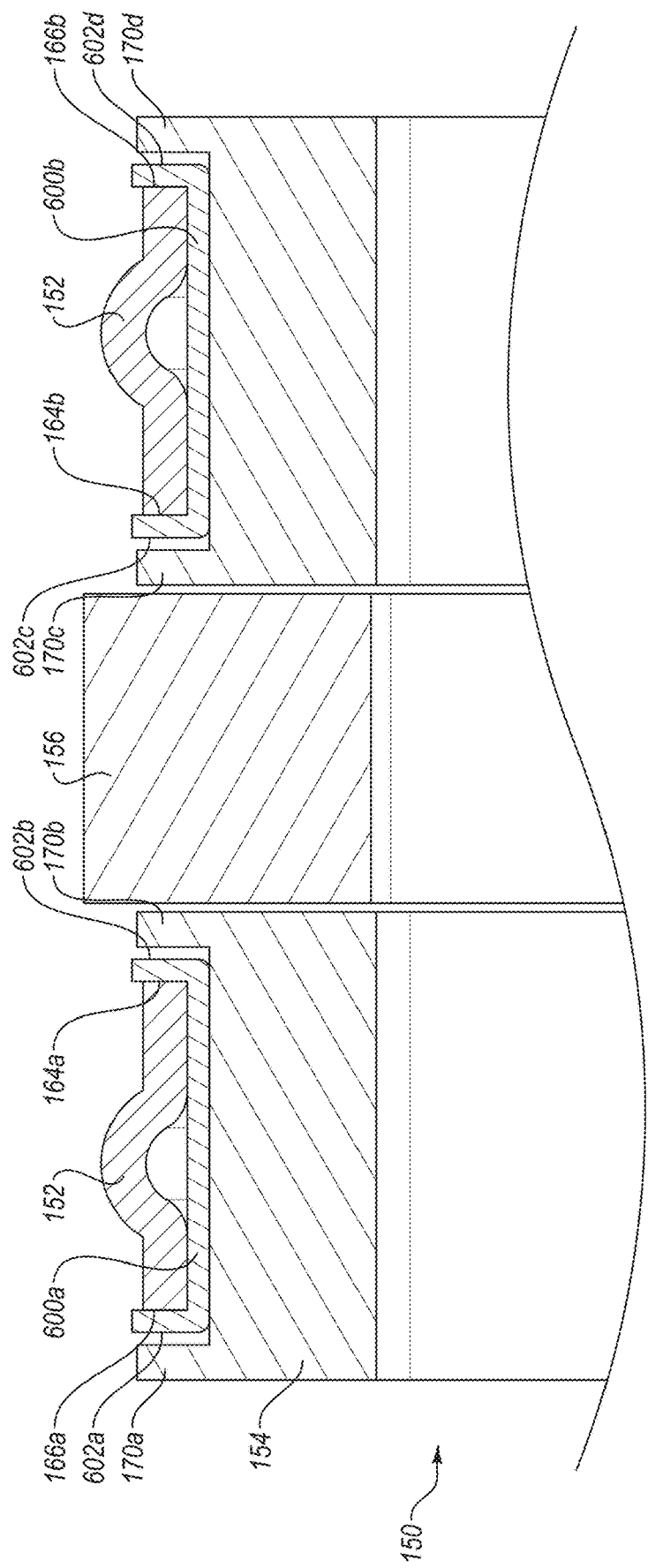

FIGS. 6A-6C illustrate another exemplary embodiment of torque tube interface 150 having wear guards that protect one or more lip portions of the rotating bearing 154 from edges of the bearing housing 152. Specifically, FIG. 6A illustrates an isometric view of wear guards 600a and 600b, FIG. 6B illustrates an isometric view of the bearing housing 152 with the wear guards 600a and 600b installed, and FIG. 6C illustrates a side cut away view of a top portion of the torque tube interface 150 with wear the guards 600a and 600b installed.

One or more of the outer surfaces of the wear guards 600a and 600b may be smooth controlled surfaces that are configured to minimize wear with opposing surfaces. For example, the wear guards 600a and 600b include side portions 602a, 602b, 602c, and 602d that have smooth controlled surfaces that are configured to minimize wear with opposing surfaces. The wear guards 600a and 600b also include spanning portions 604a and 604b. The spanning portion 604a spans a distance between and connect the side portions 602a and 602b. The spanning portion 604b spans a distance and connect the side portions 602c and 602d. The wear guards 600a and 600b are configured to be positioned between one or more of the interfaces between the bearing housing 152 and the rotating bearing 154. For example, as can be seen in FIG. 6B, the wear guard 600a is attached to portions of edges 166a and 164a of the bearing housing 152. The wear guard 600b is attached to portions of edges 164b and 166b of the bearing housing 152.

In some embodiments, the wear guards 600a and 600b may remain stationary relative to the bearing housing 152. When the rotating bearing 154 is positioned within the bearing housing 152, the lip portions 170a, 170b, 170c, and 170d do not directly interface with the edges 164a, 164b, 166a, and 166b, regardless of the rotational configuration of the rotating bearing 154 within the bearing housing 152. Rather, the lip portions 170a, 170b, 170c and 170d interface with and rub against the side portions 602a, 602b, 602c, and 602d, respectively, of the wear guards 600a and 600b. By eliminating a direct interface between the lip portions 170a, 170b, 170c, and 170d and the edges 166a, 164a, 164b, and 166b, wear and damage that may be caused by the edges 166a, 164a, 164b, and 166b to the lip portions 170a, 170b, 170c, and 170d or by the lip portions 170a, 170b, 170c, and 170d to the edges 166a, 164a, 164b, and 166b can be avoided or reduced.

In addition, wear guards 600a and 600b also provide a barrier between at least a portion of an outer surface of the rotating bearing 154 and at least a portion of an interior surface of the bearing housing 152. Specifically, spanning portions 604a and 604b protect against wear caused between an outer surface of the rotating bearing 154 and an interior surface of the bearing housing 152. The wear caused between an outer surface of the rotating bearing 154 and an interior surface of the bearing housing 152 may be caused by lateral loading that is applied to the bearing by the torque tube.

FIG. 6C illustrates a cross sectional view of the torque tube interface 150 along a plane 684 shown in FIG. 6B with the wear guards 600a and 600b installed. The wear guards 600a and 600b have cross sectional U shapes. The wear guard 600a is configured to fit on a portion of the bottom surface of the bearing housing 152 between the edges 166a and 164a. The wear guard 600b is configured to fit on a portion of a bottom surface of the bearing housing 152 between the edges 164b and 166b. The wear guards 600a and 600b may be adhered to the bearing housing 152 using an epoxy or glue. As can be seen in FIG. 6C, the side portion 602a of the wear guard 600a is positioned between bearing housing 152 and rotating bearing 154 such that the lip portion 170a of rotating bearing 154 is protected from direct contact with the edge 166a of the bearing housing 152. The side portion 602b of the wear guard 600a is positioned between the bearing housing 152 and rotating bearing 154 such that the lip portion 170b of rotating bearing 154 is protected from direct contact with the edge 164a of the bearing housing 152. The side portion 602c of the wear guard 600b is positioned between the bearing housing 152 and rotating bearing 154 such that the lip portion 170c of rotating bearing 154 is protected from direct contact with the edge 164b of the bearing housing 152. The side portion 602d of the wear guard 600b is positioned between the bearing housing 152 and rotating bearing 154 such that the lip portion 170d of rotating bearing 154 is protected from direct contact with the edge 166b of the bearing housing 152.

Figure 7A:
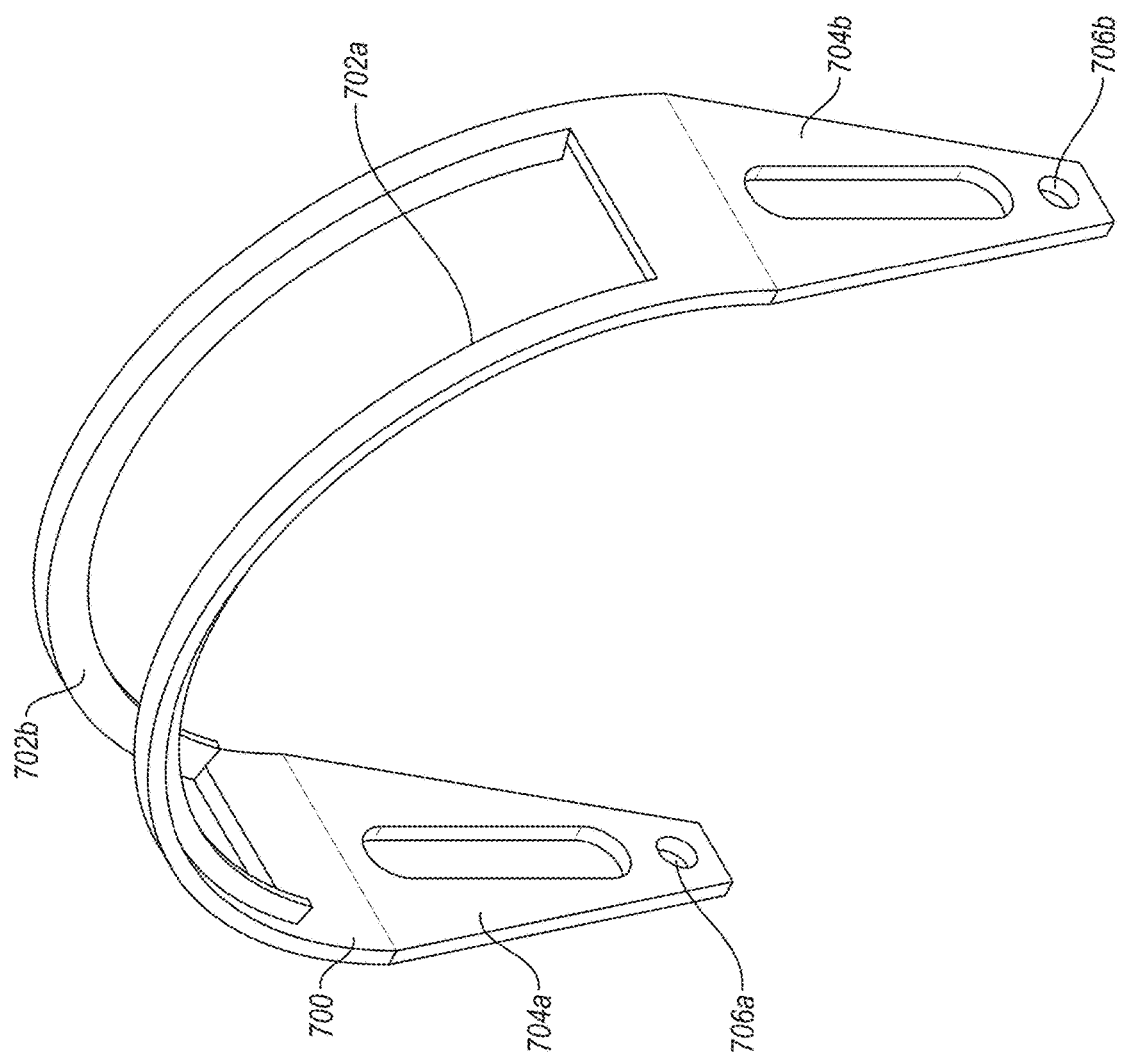
FIGS. 7A-7B illustrate another example of a wear guard according to the present disclosure in both an installed and uninstalled state.
Figure 7B:
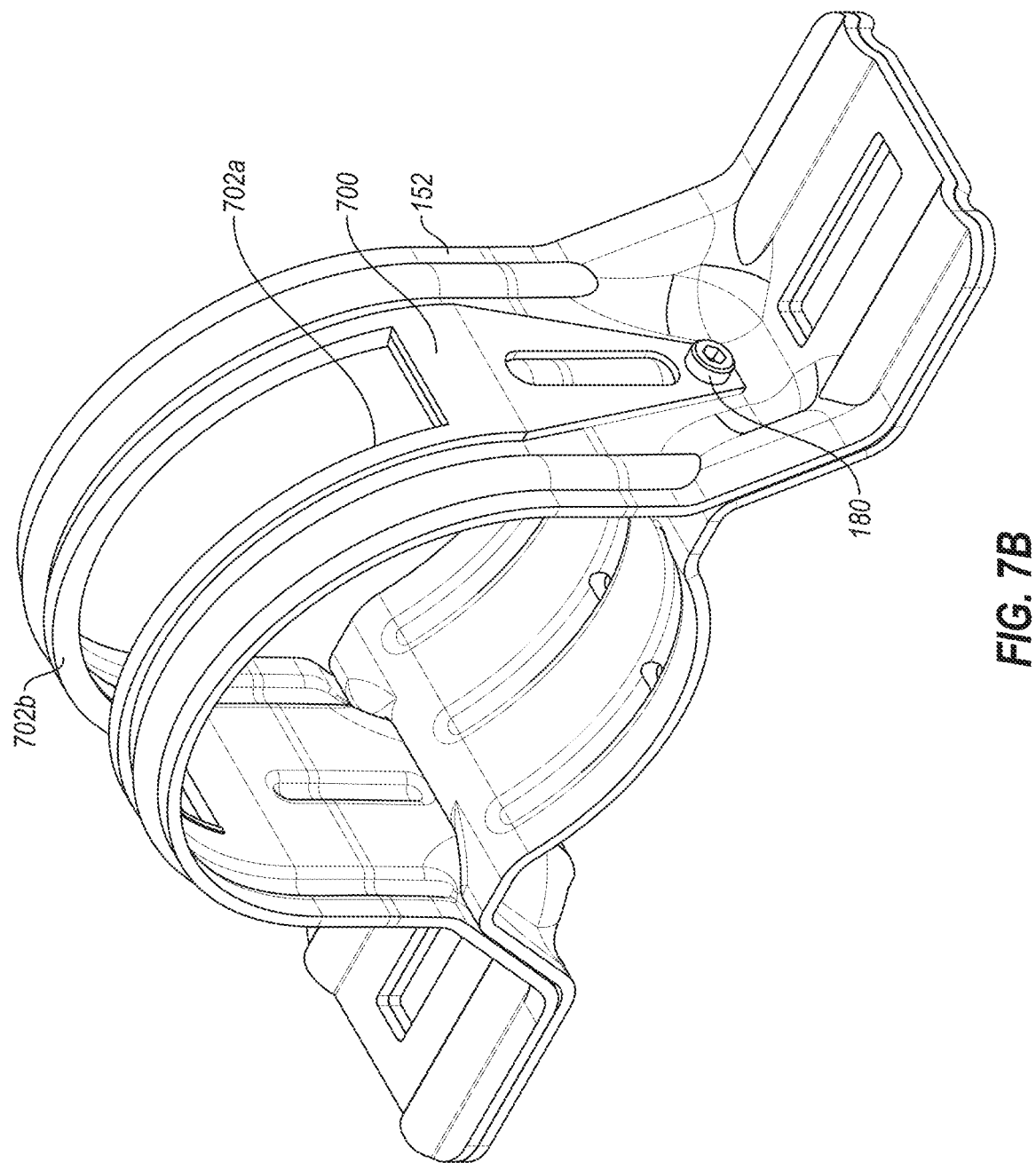

FIGS. 7A-7B illustrate another exemplary embodiment of torque tube interface 150 having a wear guard that protect one or more lip portions of the rotating bearing 154 from edges of the bearing housing 152. Specifically, FIG. 7A illustrates an isometric view of wear guard 700 and FIG. 7B illustrates an isometric view of the bearing housing 152 with the wear guard 700 installed.

One or more of the outer surfaces of the wear guard 700 may be smooth controlled surfaces that are configured to minimize wear with opposing surfaces. For example, the wear guard 700 include side portions 702a and 702b that have smooth controlled surfaces that are configured to minimize wear with opposing surfaces. The wear guard 700 also includes connection arms 704a and 704b, which may extend ends of the wear guard 700 to connection holes 706a and 706b. These connection holes 706a and 706b may align with a feature on the bearing housing 152 to facilitate connection of the wear guard 700 to the bearing housing 152. For example, as can be seen in FIG. 7B, the connection holes 706a and 706b align with bolts 180 on the bearing housing 152 to secure the wear guard 700 to the bearing housing 152.

The wear guard 700 is configured to be positioned between one or more of the interfaces between the bearing housing 152 and the rotating bearing 154. For example, as can be seen in FIG. 7B, the wear guard 700 is configured such that the side portion 702a is positioned at an interface between the edge 164a of the bearing housing 152 and the rotating bearing 154 (not shown) and the side portion 702b is positioned at an interface between the edge 164*b* of the bearing housing 152 and the rotating bearing 154 (not shown).

When the rotating bearing 154 is positioned within the bearing housing 152, the lip portions 170*b* and 170*c* do not directly interface with the edges 164*a* and 164*b*, regardless of the rotational configuration of the rotating bearing 154 within the bearing housing 152. Rather, the lip portions 170*b* and 170*c* may interface with and rub against the side portions 702*a* and 702*b*, respectively, of the wear guard 700. By eliminating a direct interface between the lip portions 170*b* and 170*c* and the edges 164*a* and 164*b*, wear and damage that may be caused by the edges 164*a* and 164*b* to the lip portions 170*b* and 170*c* or by the lip portions 170*b* and 170*c* to the edges 164*a* and 164*b* can be avoided or reduced.

Figure 8A:
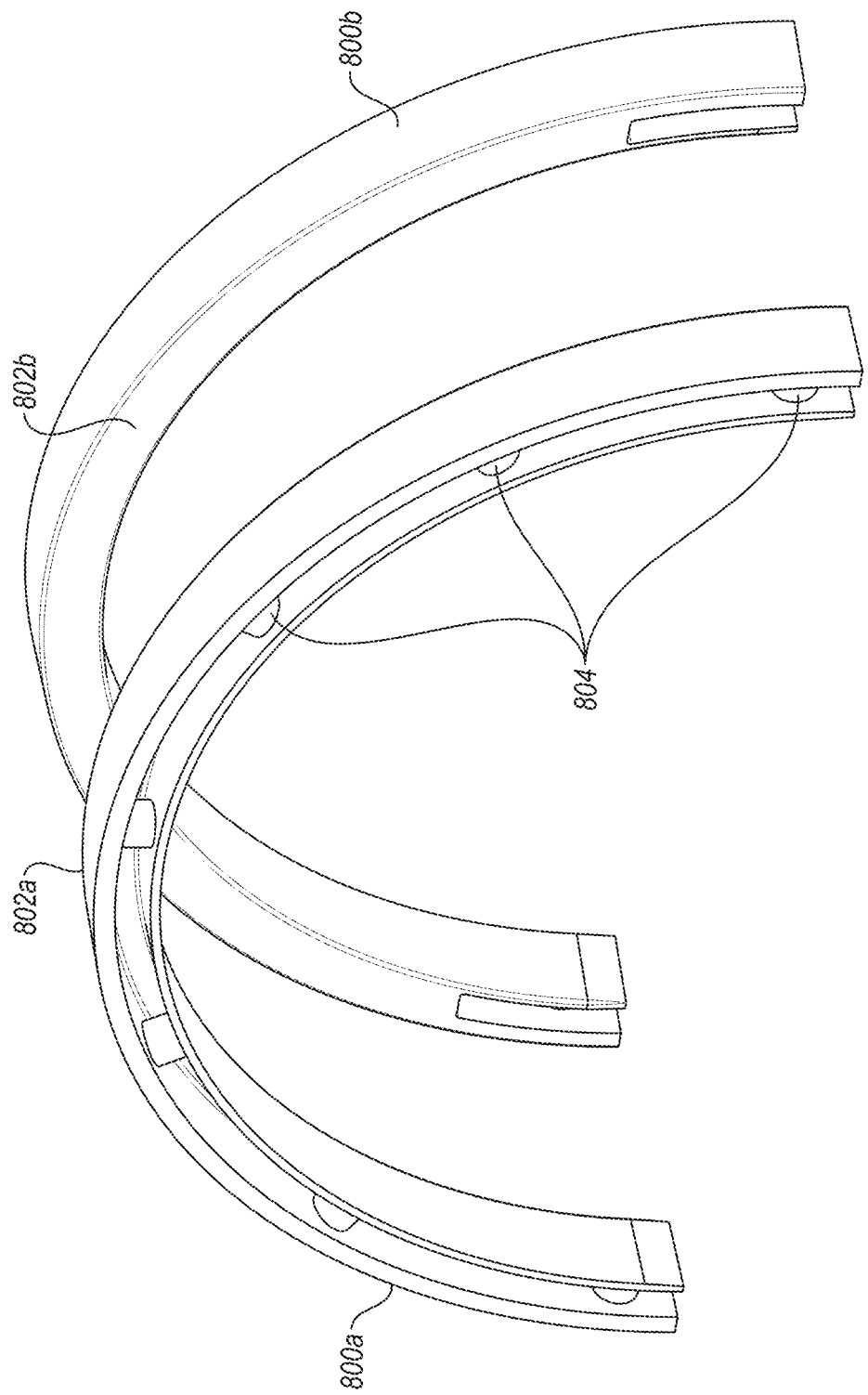
FIGS. 8A-8C illustrate another example of wear guards according to the present disclosure in both an installed and uninstalled state.
Figure 8B:
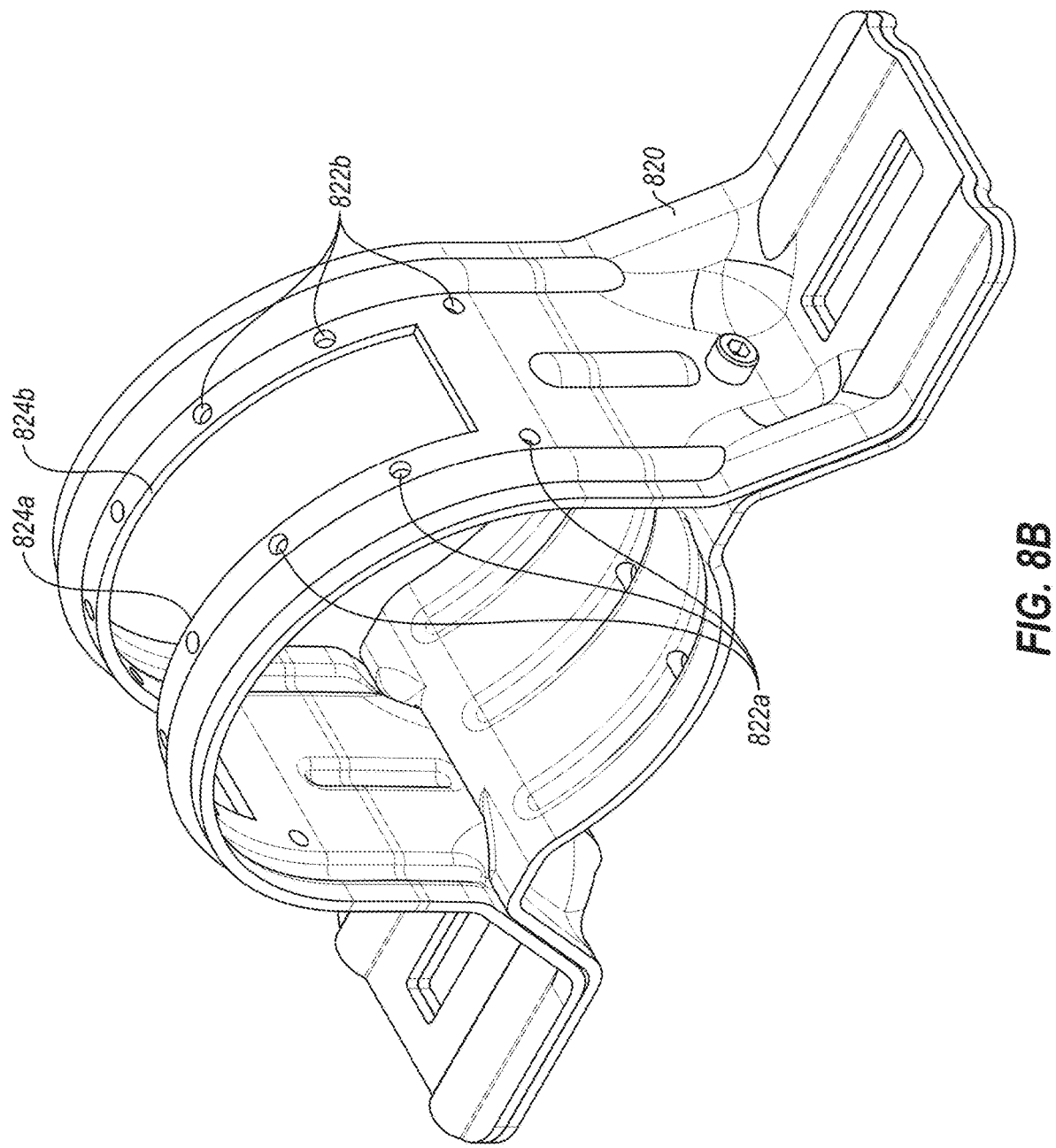
Figure 8C:
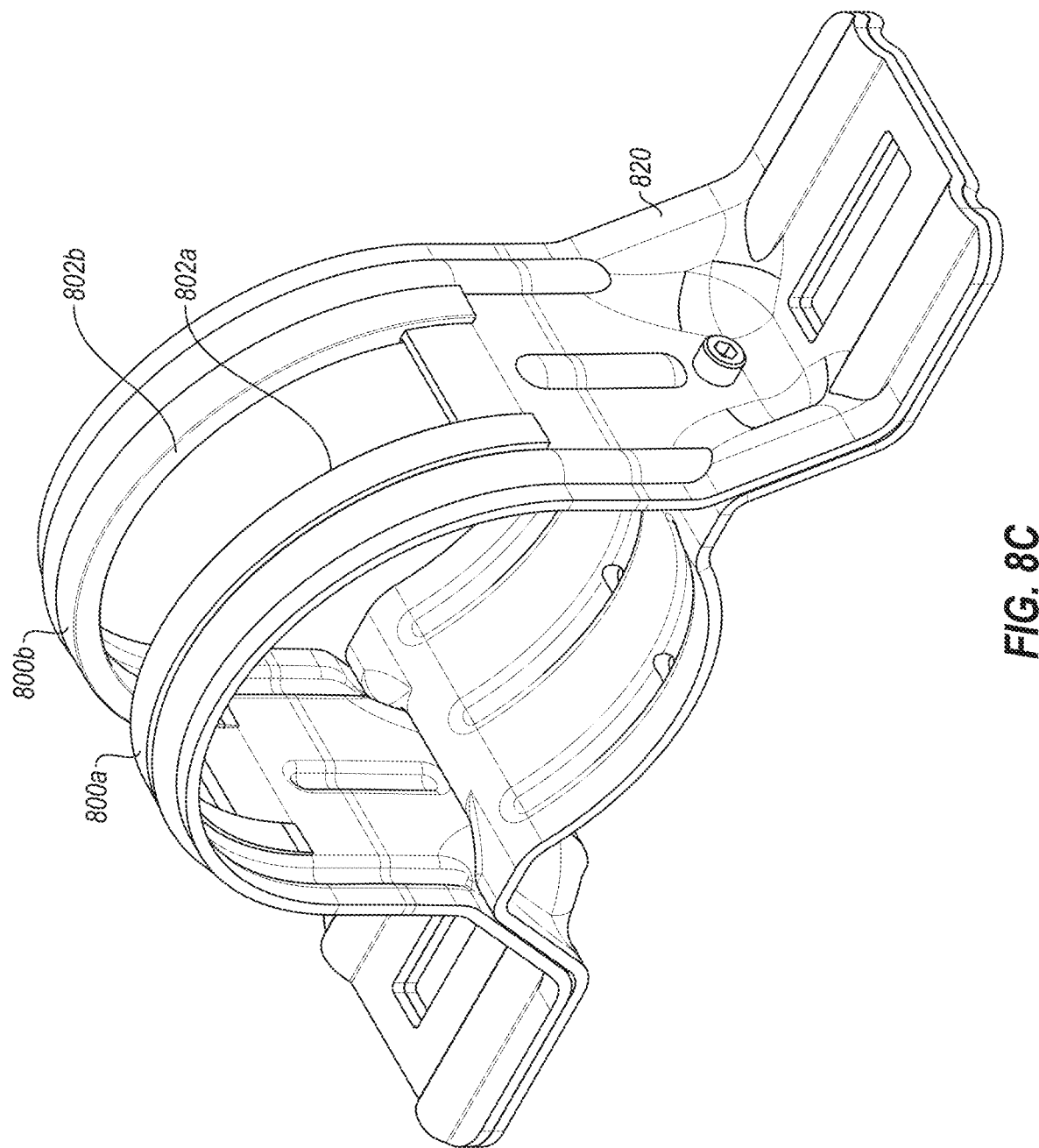

FIGS. 8A-8C illustrate another exemplary embodiment of a torque tube interface having wear guards 800*a* and 800*b* that protect one or more lip portions of a rotating bearing from edges of a bearing housing. Specifically, FIG. 8A illustrates an isometric view of wear guards 800*a* and 800*b*, FIG. 8B illustrates an isometric view of a bearing housing 820 on which the wear guards 800*a* and 800*b* may be installed, and FIG. 8C illustrates an isometric view of the bearing housing 820 with the wear guards 800*a* and 800*b* installed.

One or more of the outer surfaces of the wear guards 800*a* and 800*b* may be smooth controlled surfaces that are configured to minimize wear with opposing surfaces. For example, the wear guard 800*a* may include a side portion 802*a* that has a smooth controlled surface that is configured to minimize wear with opposing surfaces. The wear guard 800*b* may include a side portion 802*b* that has a smooth controlled surface that is configured to minimize wear with opposing surfaces. The wear guards 800*a* and 800*b* also include a plurality of retention bars 804 that are configured to align with holes in a bearing housing to retain the wear guards 800*a* and 800*b* in place. One end of the retention bars 804 is connected to an inner surface of the wear guards 800*a* and 800*b*, while an opposing end of the retention bars 804 is disconnected from any inner surface of the wear guards 800*a* and 800*b*. Thus, a portion of the bearing housing 820 may be inserted between an unconnected end of the retention bars and an inner surface of the wear guard. In this manner, the retention bars 804 may be snapped into place with corresponding holes in the bearing housing 820.

For example, as can be seen in FIG. 8B, the bearing housing 820 includes a plurality of holes 822*a* and 822*b* that are sized and shaped to receive the retention bars 804. The holes 822*a* and 822*b* run along edges 824*a* and 824*b*. The wear guards 800*a* and 800*b* are installed on the bearing housing 820 by inserting the edges 824*a* and 824*b* between an unconnected end of the retention bars 804 and an inner surface of the wear guard. The retention bars 804 in the wear guard 800*a* align with the holes 822*a* to snap the wear guard 800*a* into place. The retention bars 804 in the wear guard 800*b* align with the holes 822*b* to snap the wear guard 800*b* into place.

The wear guards 800*a* and 800*b* are configured to be positioned between one or more of the interfaces between the bearing housing 820 and a rotating bearing, such as rotating bearing 154. For example, as can be seen in FIG. 8C, the wear guards 800*a* and 800*b* are configured such that the side portion 802*a* is positioned at an interface between the edge 824*a* of the bearing housing 820 and the rotating bearing 154 (not shown) and the side portion 802*b* is positioned at an interface between the edge 824*b* of the bearing housing 820 and the rotating bearing 154 (not shown).

When a rotating bearing, such as the rotating bearing 154, is positioned within the bearing housing 820, the lip portions 170*b* and 170*c* do not directly interface with the edges 824*a* and 824*b*, regardless of the rotational configuration of the rotating bearing 154 within the bearing housing 820. Rather, the lip portions 170*b* and 170*c* interface with and rub against the side portions 802*a* and 802*b*, respectively, of the wear guards 800*a* and 800*b*. By eliminating a direct interface between the lip portions 170*b* and 170*c* and the edges 824*a* and 824*b*, wear and damage that may be caused by the edges 824*a* and 824*b* to the lip portions 170*b* and 170*c* or by the lip portions 170*b* and 170*c* to the edges 824*a* and 824*b* can be avoided or reduced.

Figure 9A:
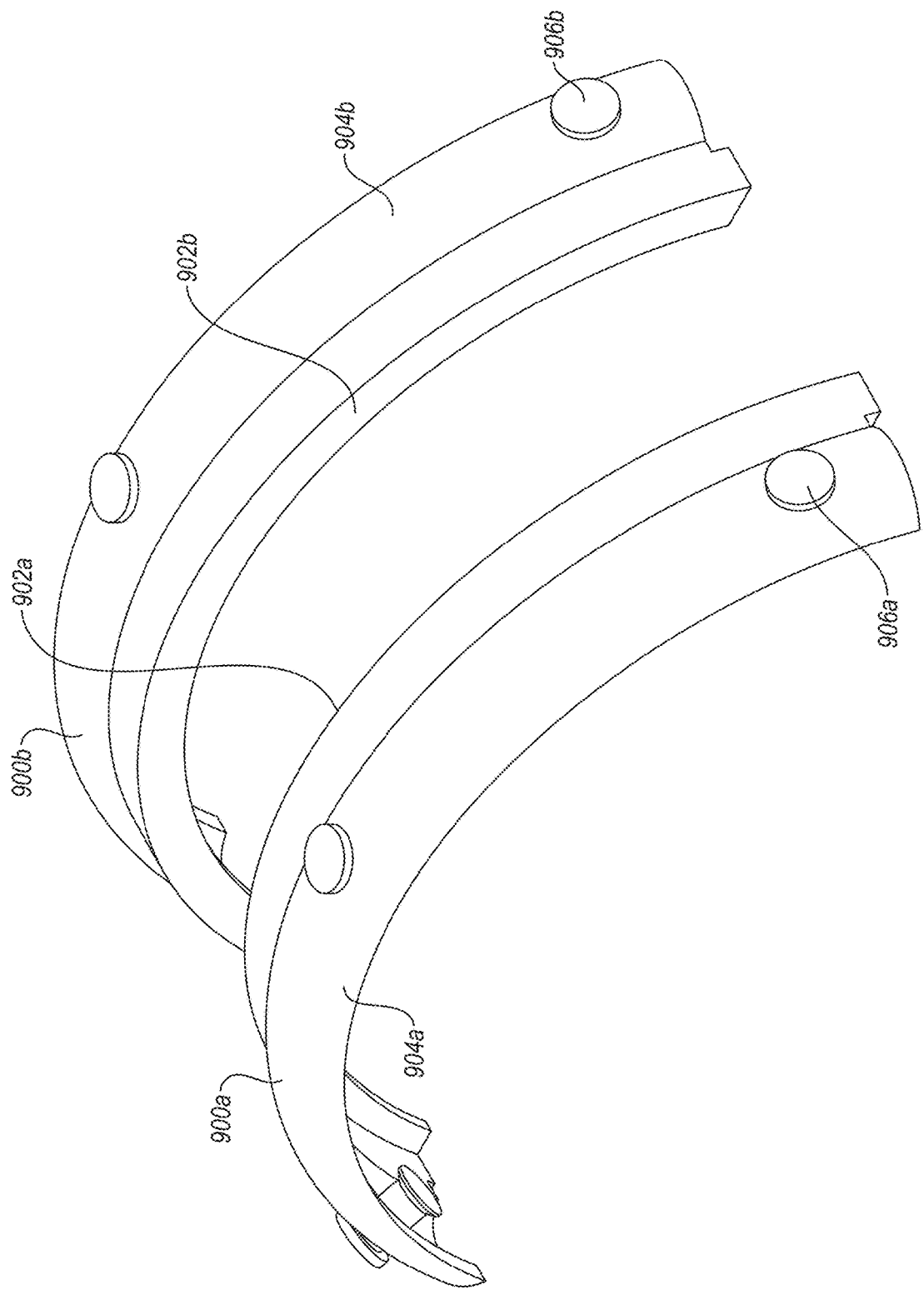
FIGS. 9A-9C illustrate another example of wear guards according to the present disclosure in both an installed and uninstalled state.
Figure 9B:
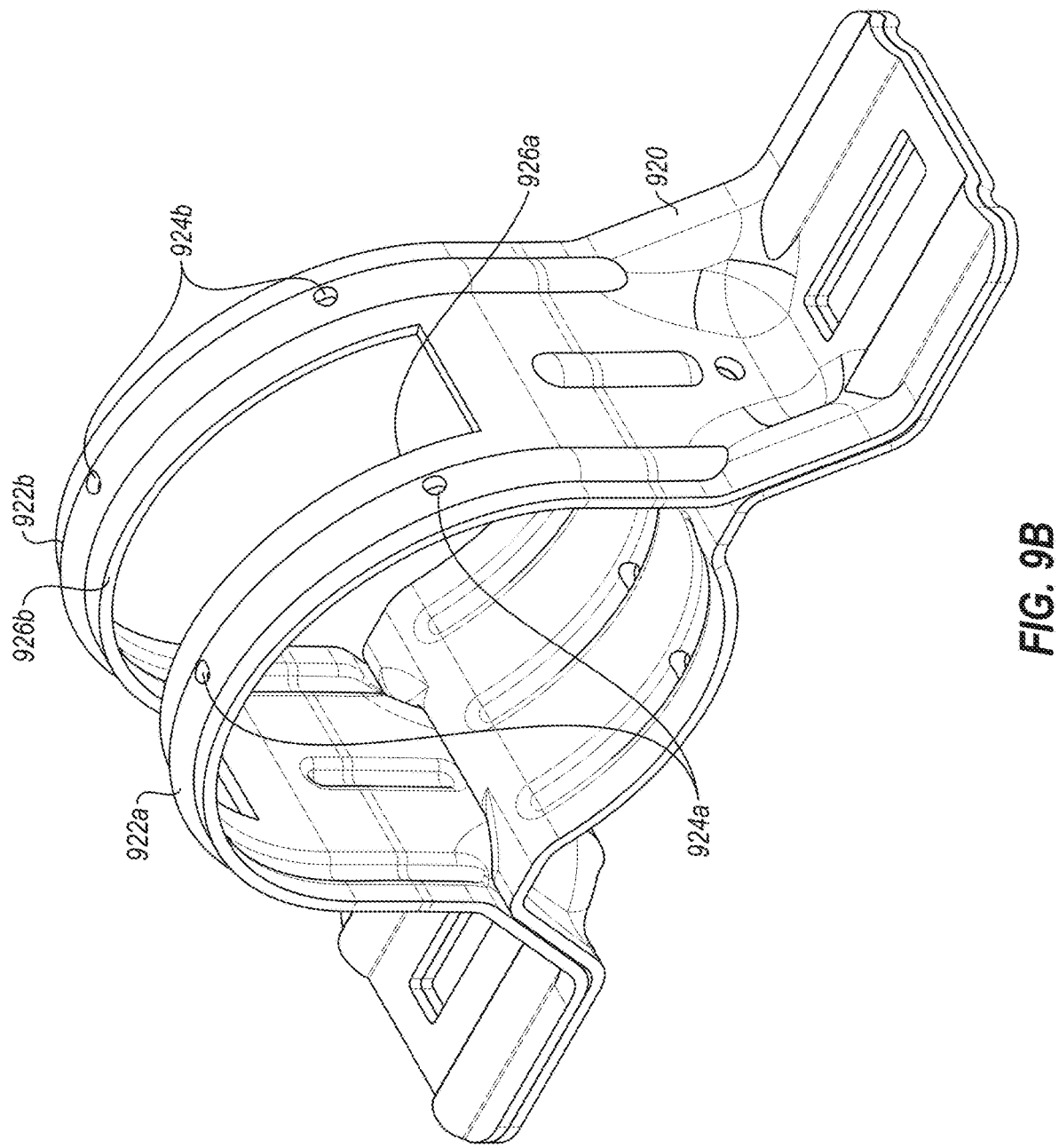
Figure 9C:
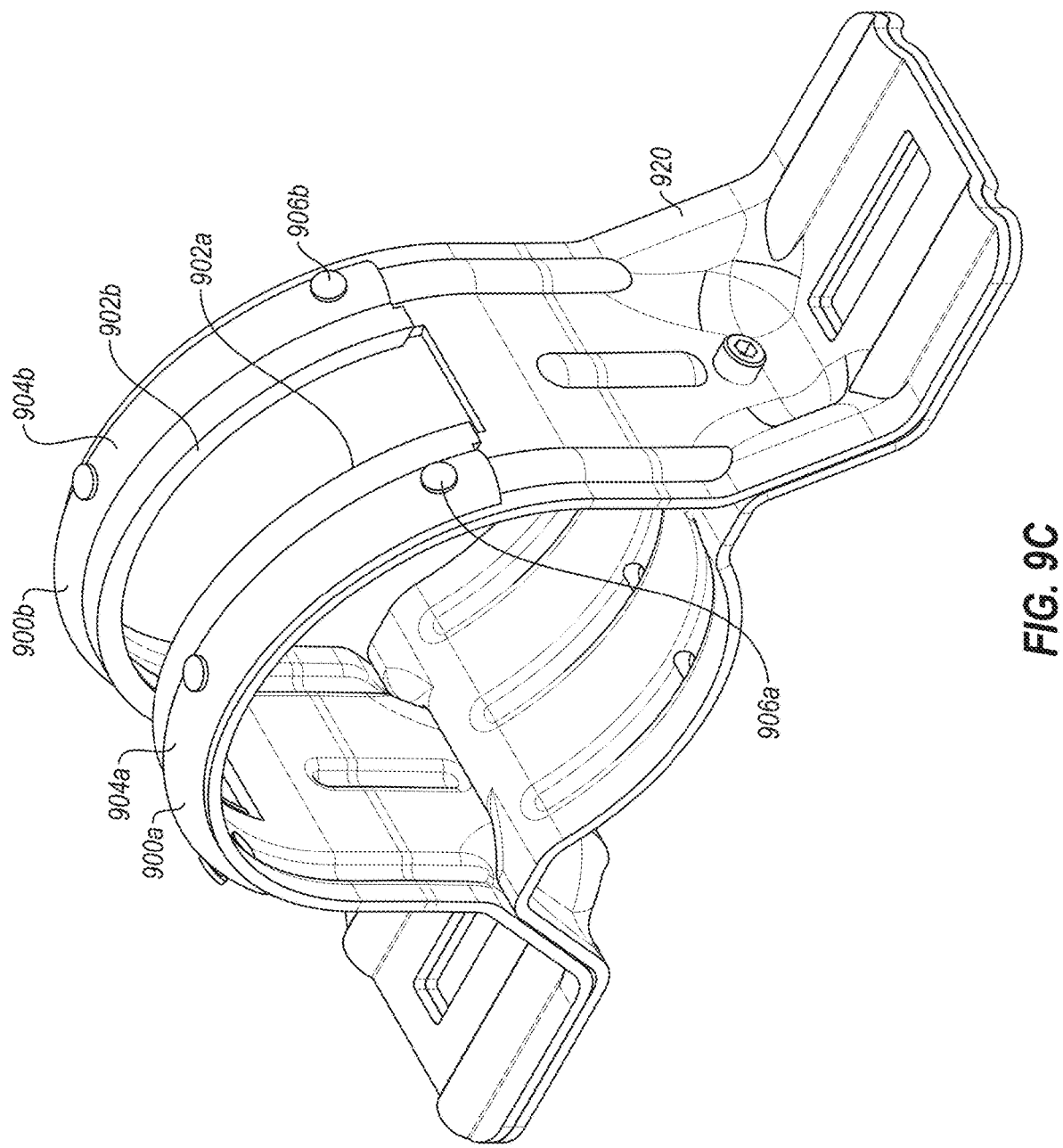

FIGS. 9A-9C illustrate another exemplary embodiment of a torque tube interface having wear guards 900*a* and 900*b* that protect one or more lip portions of a rotating bearing from edges of a bearing housing. Specifically, FIG. 9A illustrates an isometric view of wear guards 900*a* and 900*b*, FIG. 9B illustrates an isometric view of a bearing housing 920 on which the wear guards 900*a* and 900*b* may be installed, and FIG. 9C illustrates an isometric view of the bearing housing 920 with the wear guards 900*a* and 900*b* installed.

The wear guards 900*a* and 900*b* include side portions 902*a* and 902*b* that have smooth controlled surfaces that are configured to minimize wear with opposing surfaces. The wear guards 900*a* and 900*b* also include flanges 904*a* and 904*b* that are configured to align with all or part of structural ridges 922*a* and 922*b* in the bearing housing 920. The wear guards 900*a* and 900*b* further include retention bars 906*a* and 906*b* that align with holes in a bearing housing to help retain the wear guards 900*a* and 900*b* in place.

For example, as can be seen in FIG. 9B, the bearing housing 920 includes a plurality of holes 924*a* and 924*b* on the structural ridges 922*a* and 922*b* that are sized and shaped to receive the retention bars 906*a* and 906*b*. The wear guards 900*a* an 900*b* may be installed on the bearing housing 920 by inserting the retention bars 906*a* and 906*b* into the corresponding holes 924*a* and 924*b* on the structural ridges 922*a* and 922*b*. Once installed, the retention bars 906*a* and 906*b* may be heat staked within the holes 924*a* and 924*b* in order to ensure the retention bars 906*a* and 906*b* remain within the holes 924*a* and 924*b*.

For example, as can be seen in FIG. 9C, the wear guards 900*a* and 900*b* have been installed on bearing housing 920. The flanges 904*a* and 904*b* are positioned on the structural ridges 922*a* and 922*b* and the retention bars 906*a* and 906*b* are positioned within the holes 924*a* and 924*b*. In addition, the wear guards 900*a* and 900*b* are configured such that the side portion 902*a* is positioned at an interface between the edge 926*a* of the bearing housing 920 and a rotating bearing (not shown) and the side portion 902*b* is positioned at an interface between the edge 926*b* of the bearing housing 920 and a rotating bearing (not shown).

When a rotating bearing, such as the rotating bearing 154, is positioned within the bearing housing 920, the lip portions 170*b* and 170*c* do not directly interface with the edges 926*a* and 926*b*, regardless of the rotational configuration of the rotating bearing 154 within the bearing housing 920. Rather, the lip portions 170*b* and 170*c* interface with and rub against the side portions 902*a* and 902*b*, respectively, of the wear guards 900*a* and 900*b*. By eliminating a direct interface between the lip portions 170*b* and 170*c* and the edges 926*a* and 926*b*, wear and damage that may be caused by the edges 926a and 926b to the lip portions 170b and 170c or by lip portions 170b and 170c to the edges 926a and 926b can be avoided or reduced.

Figure 10A:
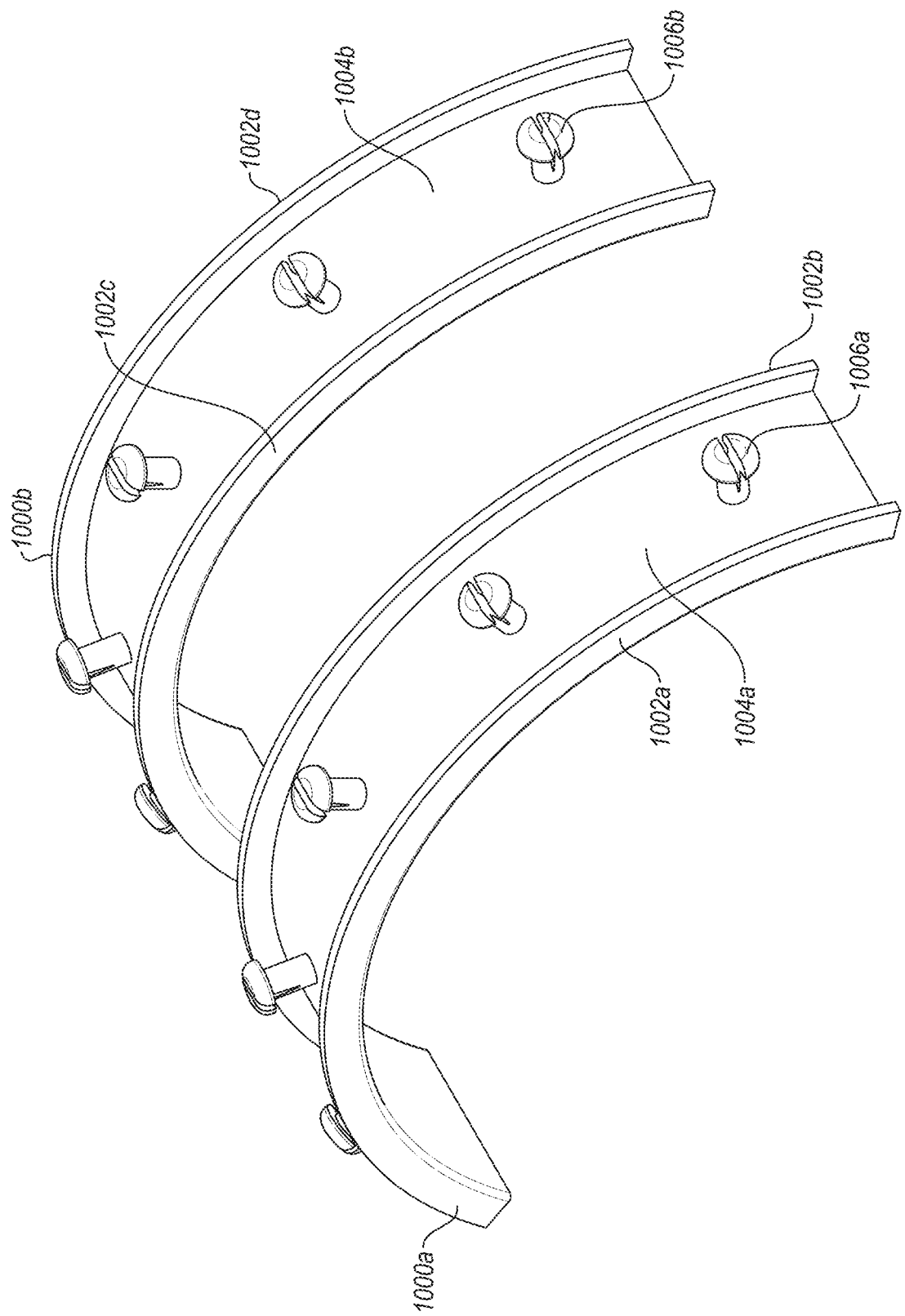
FIGS. 10A-10C illustrate another example of wear guards according to the present disclosure in both an installed and uninstalled state.
Figure 10B:
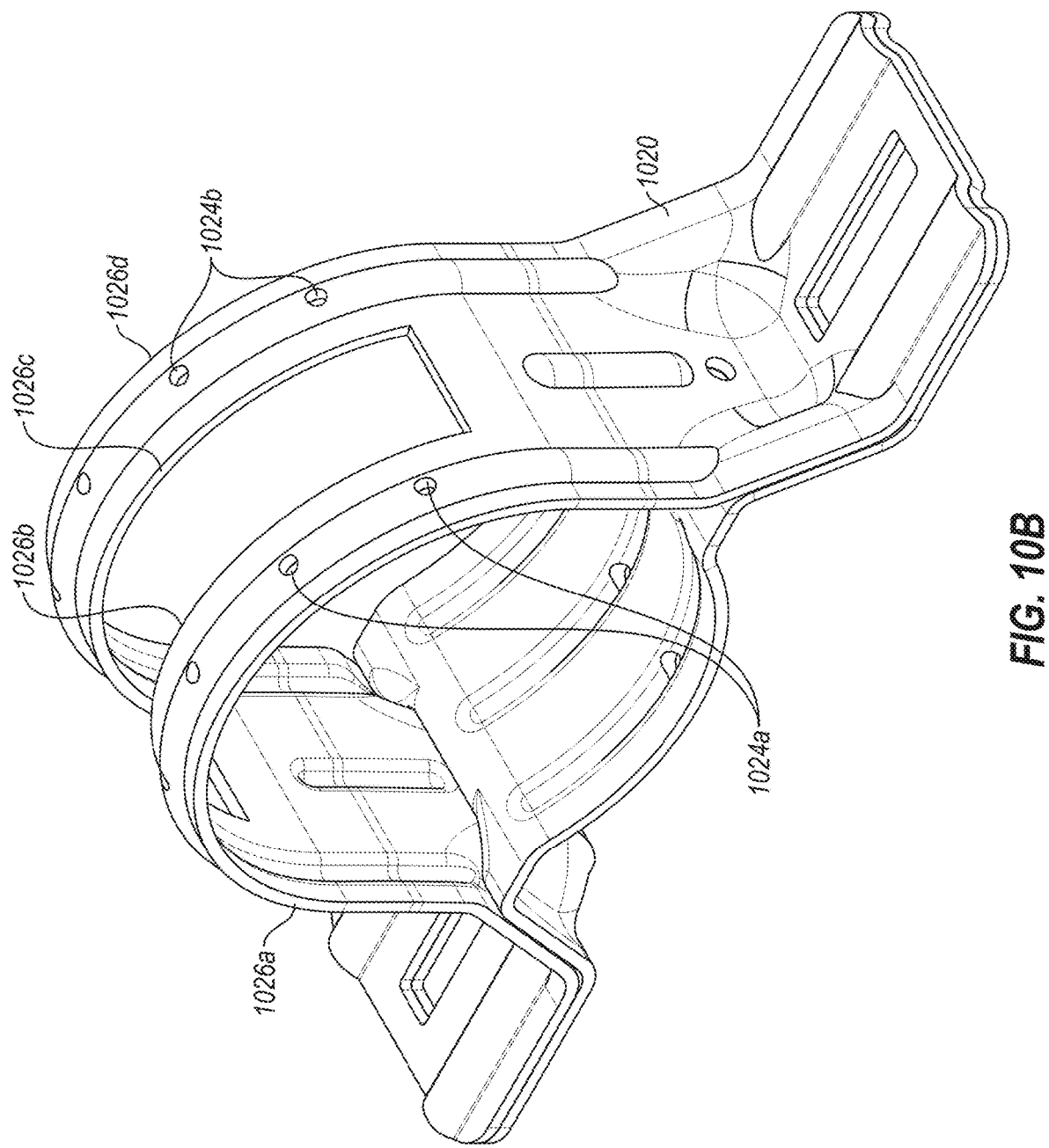
Figure 10C:
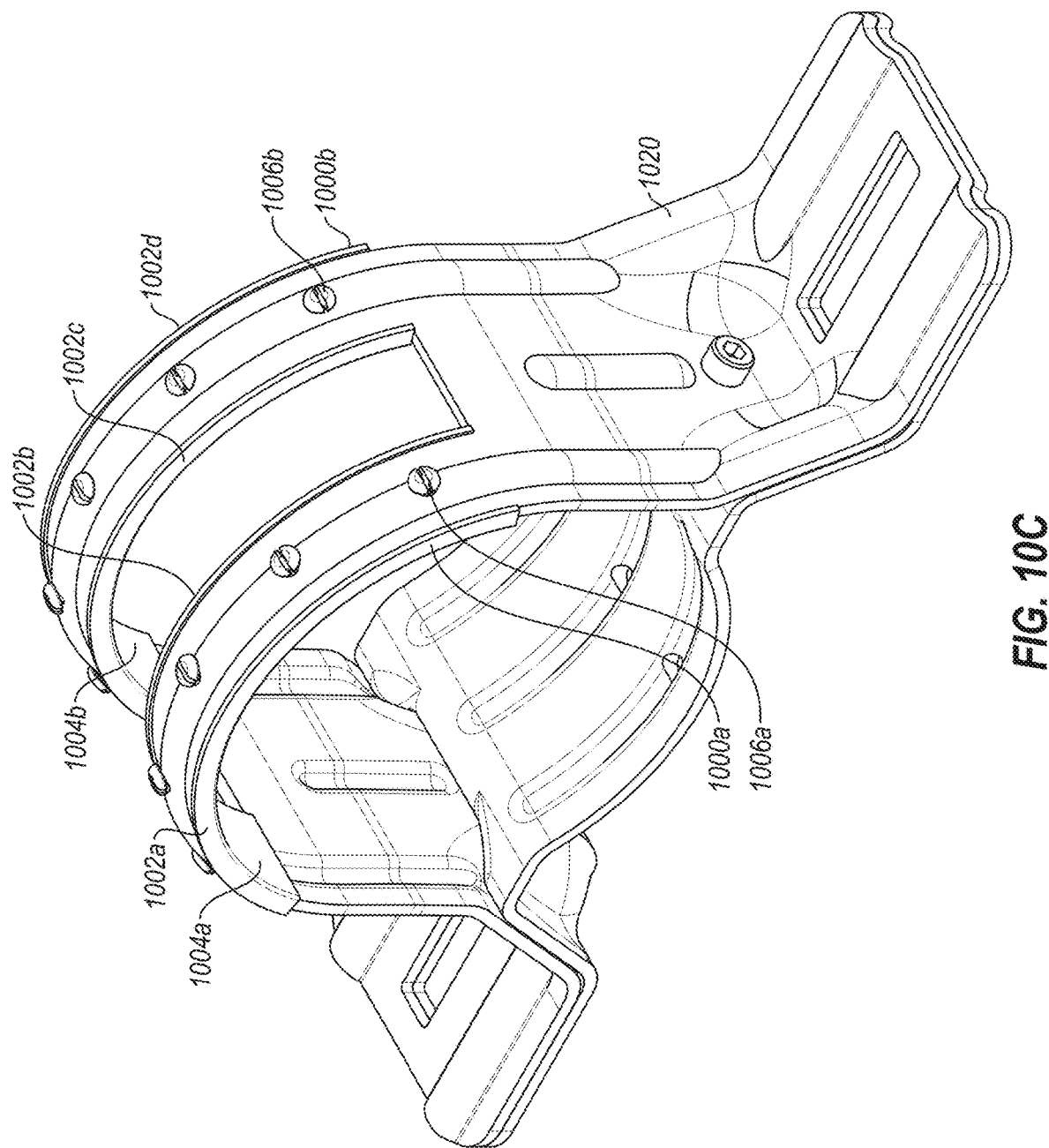

FIGS. 10A-10C illustrate another exemplary embodiment of a torque tube interface having wear guards 1000a and 1000b that protect one or more lip portions of a rotating bearing from edges of a bearing housing. Specifically, FIG. 10A illustrates an isometric view of wear guards 1000a and 1000b, FIG. 10B illustrates an isometric view of a bearing housing 1020 on which the wear guards 1000a and 1000b may be installed, and FIG. 10C illustrates an isometric view of the bearing housing 1020 with the wear guards 1000a and 1000b installed.

The wear guards 1000a and 1000b include side portions 1002a, 1002b, 1002c, and 1002d that have smooth controlled surfaces that are configured to minimize wear with opposing surfaces. The wear guards 1000a also includes a spanning portion 1004a that is configured to connect side portions 1002a and 1002b. A spanning portion 1004b on wear guard 1000b is configured to connect side portions 1002c and 1002d. The wear guards 1000a and 1000b further include retention bars 1006a and 1006b that align with holes in a bearing housing to help retain the wear guards 1000a and 1000b in place.

For example, as can be seen in FIG. 10B, the bearing housing 1020 includes a plurality of holes 1024a and 1024b that are sized and shaped to receive the retention bars 1006a and 1006b. The wear guards 1000a an 1000b are installed on the bearing housing 1020 by inserting the retention bars 1006a and 1006b into the corresponding holes 1024a and 1024b. Once installed, the retention bars 1006a and 1006b may be heat staked within the holes 1024a and 1024b in order to ensure the retention bars 1006a and 1006b remain within the holes 1024a and 1024b. In alternative embodiments, wear guards may be secured to a bearing or bearing housing through a snap or friction attachment.

In addition, wear guards 1000a and 1000b also provide a barrier between at least a portion of an outer surface of a bearing, such as rotating bearing 154 and at least a portion of an interior surface of the bearing housing 1020. Specifically, spanning portions 1004a and 1004b protect against wear caused between an outer surface of the rotating bearing and an interior surface of the bearing housing 1020. The wear caused between an outer surface of the rotating bearing and an interior surface of the bearing housing 1020 may be caused by lateral loading that is applied to the bearing by the torque tube.

For example, as can be seen in FIG. 10C, the wear guards 1000a and 1000b have been installed on bearing housing 1020. The spanning portions 1004a and 1004b are positioned on interior surfaces of the bearing housing 1020 and the retention bars 1006a and 1006b are positioned within the holes 1024a and 1024b. In addition, the wear guards 1000a and 1000b are configured such that the side portion 1002a is positioned at an interface between the edge 1026a of the bearing housing 1020 and a rotating bearing (not shown). The side portion 1002b is positioned at an interface between the edge 1026b of the bearing housing 1020 and a rotating bearing (not shown). The side portion 1002c is positioned at an interface between the edge 1026c of the bearing housing 1020 and a rotating bearing (not shown). The side portion 1002d is positioned at an interface between the edge 1026d of the bearing housing 1020 and a rotating bearing (not shown).

When a rotating bearing, such as the rotating bearing 154, is positioned within the bearing housing 1020, the lip portions 170a 170b, 170c, and 170d do not directly interface with the edges 1026a, 1026b, 1026c, and 1026d, regardless of the rotational configuration of the rotating bearing 154 within the bearing housing 1020. Rather, the lip portions 170a, 170b, 170c, and 170d interface with and rub against the side portions 1002a, 1002b, 1002c, and 1002d, respectively, of the wear guards 1000a and 1000b. By eliminating a direct interface between the lip portions 170a, 170b, 170c, and 170d and the edges 1026a, 1026b, 1026c, and 1026d, wear and damage that may be caused by the edges 1026a, 1026b, 1026c, and 1026d to the lip portions 170a, 170b, 170c, and 170d or by the lip portions 170a, 170b, 170c, and 170d to the edges 1026a, 1026b, 1026c, and 1026d can be avoided or reduced.

In some embodiments, a wear guard may be coupled to a rotating bearing, such that the wear guard rotates with the bearing relative to the bearing housing. In such an embodiment, the wear guard may be coupled to the rotating bearing through any mechanism, including those described herein for coupling a wear guard to a bearing housing. In some embodiments, wear guards may cover any amount of the bearing housing edges. For example, in some embodiments, a wear guard may cover the entire lateral edge (such as edge 166a of bearing housing 152) such that the wear guard surrounds all 360 degrees of this edge. In other embodiments, only portions of this, or other edges, in a bearing housing may be covered by a wear guard.

Figure 11:
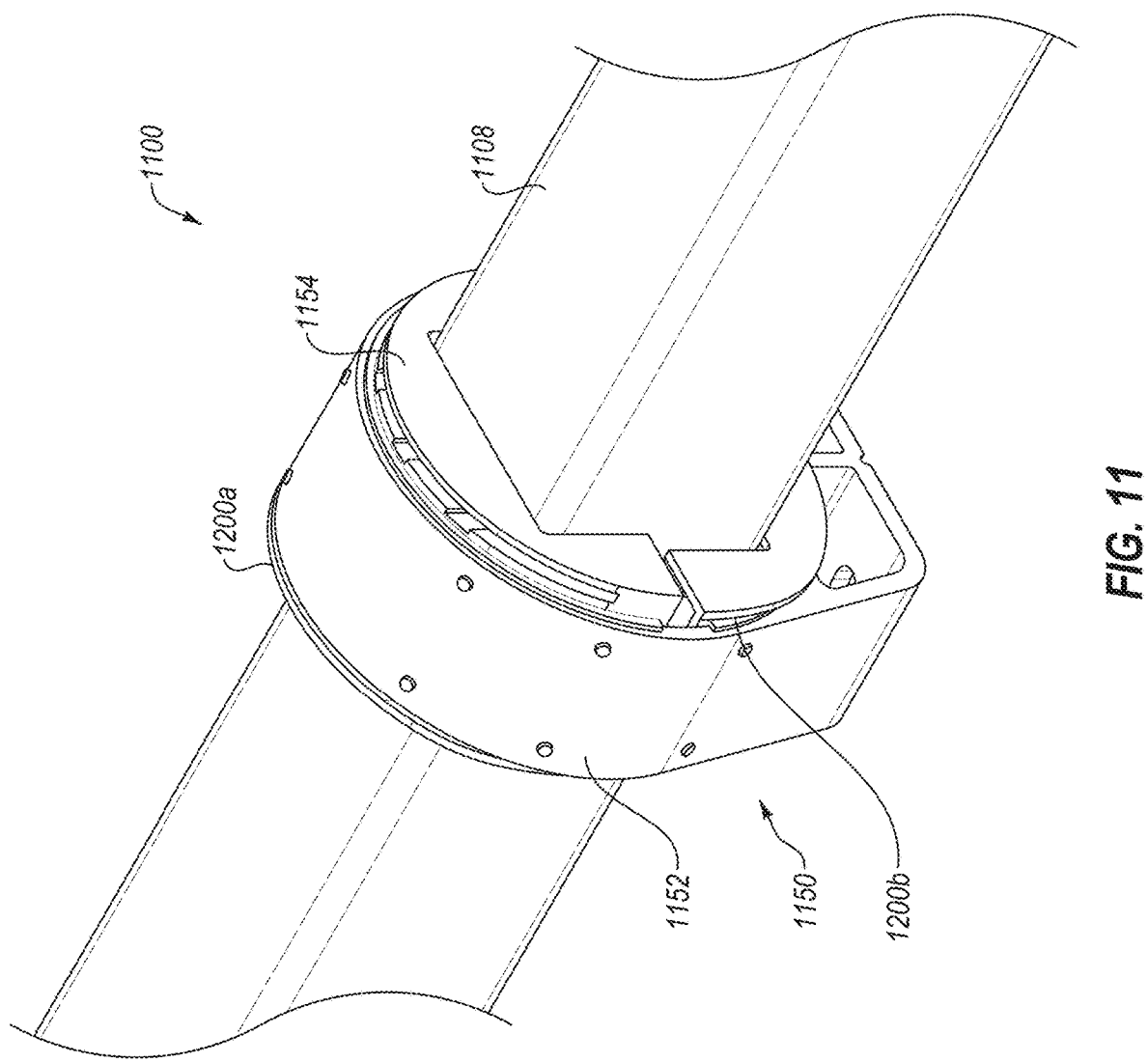
FIG. 11 illustrates another solar tracking system that includes an example wear guard according to the present disclosure.

FIG. 11 illustrates a solar tracking system 1100 that includes another example of a wear guard according to the present disclosure. The system 1100 includes a torque tube interface 1150, and a torque tube 1108, which may have secured thereto one or more PV modules (not shown). The torque tube interface 1150 may be secured to a support structure (not shown).

The torque tube interface 1150 may include a bearing housing 1152 and a rotating bearing 1154. The bearing housing 1152 can be manufactured from any suitable material, including but not limited to metal, such as aluminum or steel, plastic, a composite, or combinations of different materials. In some embodiments, sheets of pre-treated metal, such as galvanized steel, may be used which may allow for more robust components and/or greater flexibility in manufacturing and cost savings in manufacturing. Additionally or alternatively, such a material may allow for low-friction coatings to be applied to the steel prior to the forming process, thereby reducing cost.

In some embodiments, the rotating bearing 1154 can be manufactured from any suitable material, including but not limited to metal, such as aluminum or steel, plastic, a composite, or combinations of different materials. The bearing housing 1152 may be operatively coupled to the rotating bearing 1154 in a way that allows the rotating bearing 1154 at least some rotational freedom within the bearing housing 1152. Allowing the bearing 1154 to rotate within the bearing housing 1152 also allows rotational movement of the torque tube 1108 relative to a support structure. Permitting rotation of the torque tube 1108 within the bearing housing 1152 allows the PV module(s) that are attached to the torque tube 1108, to rotate with the torque tube 1108 in order to track the position of the sun as it moves across the sky.

While some rotational movement of the bearing 1154 may be permitted within the bearing housing 1152, axial movement—or movement in the direction of the torque tube 1108—may be substantially restricted. In some embodiments, to restrict this axial movement, the rotating bearing 1154 may be coupled to the torque tube 1108. Any number of different mechanisms, including screws, bolts, clamps, etc. may be used to fix a bearing to a torque tube.

In some embodiments, a plurality of PV modules may be secured to the torque tube 1108. As more PV modules are secured to the torque tube 1108, the pressure between contact surfaces or interfaces between the bearing housing 1152 and the rotating bearing 1154 may increase. This is especially true if the torque tube does not lie on a horizontal line. This axial loading may cause damage and wear to the surfaces of one or both of the bearing housing 1152 and the rotating bearing 1154 at these interfaces. To address this problem and prevent wear and damage, the torque tube interface 1150 may include wear guards 1200*a* and 1200*b* that are positioned at an interface between the bearing housing 1052 and the rotating bearing 1054.

Figure 12B:
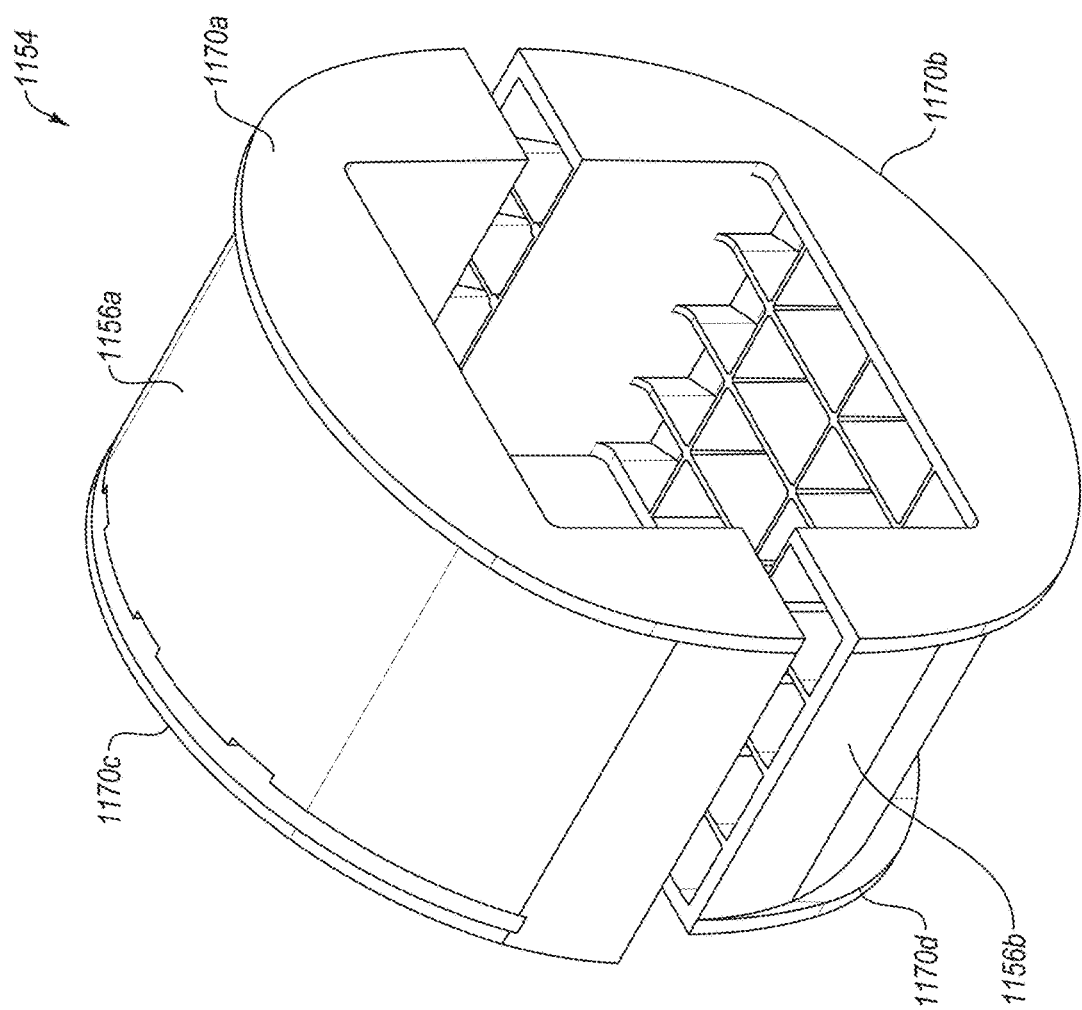
Figure 12C:
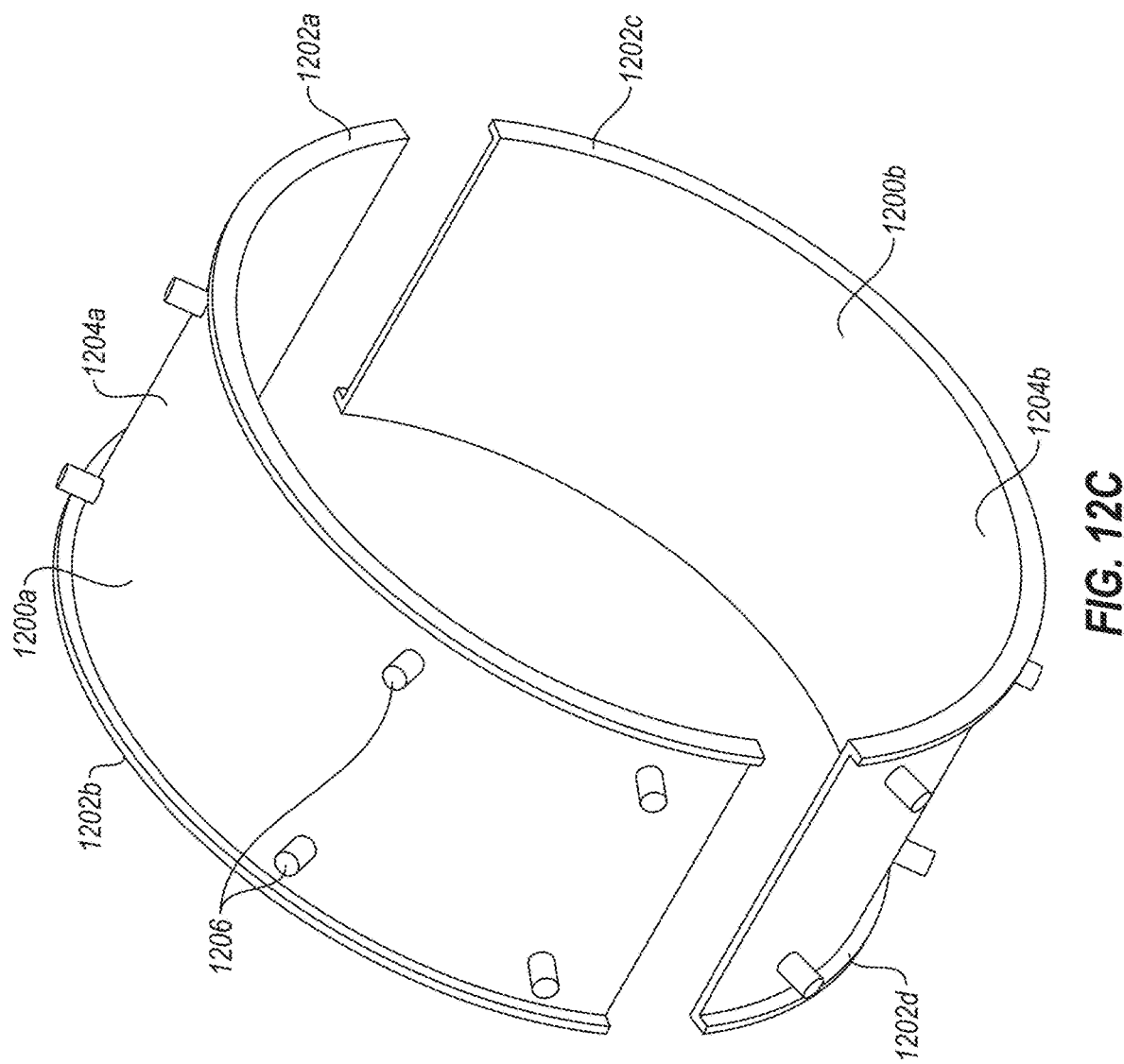
Figure 12D:
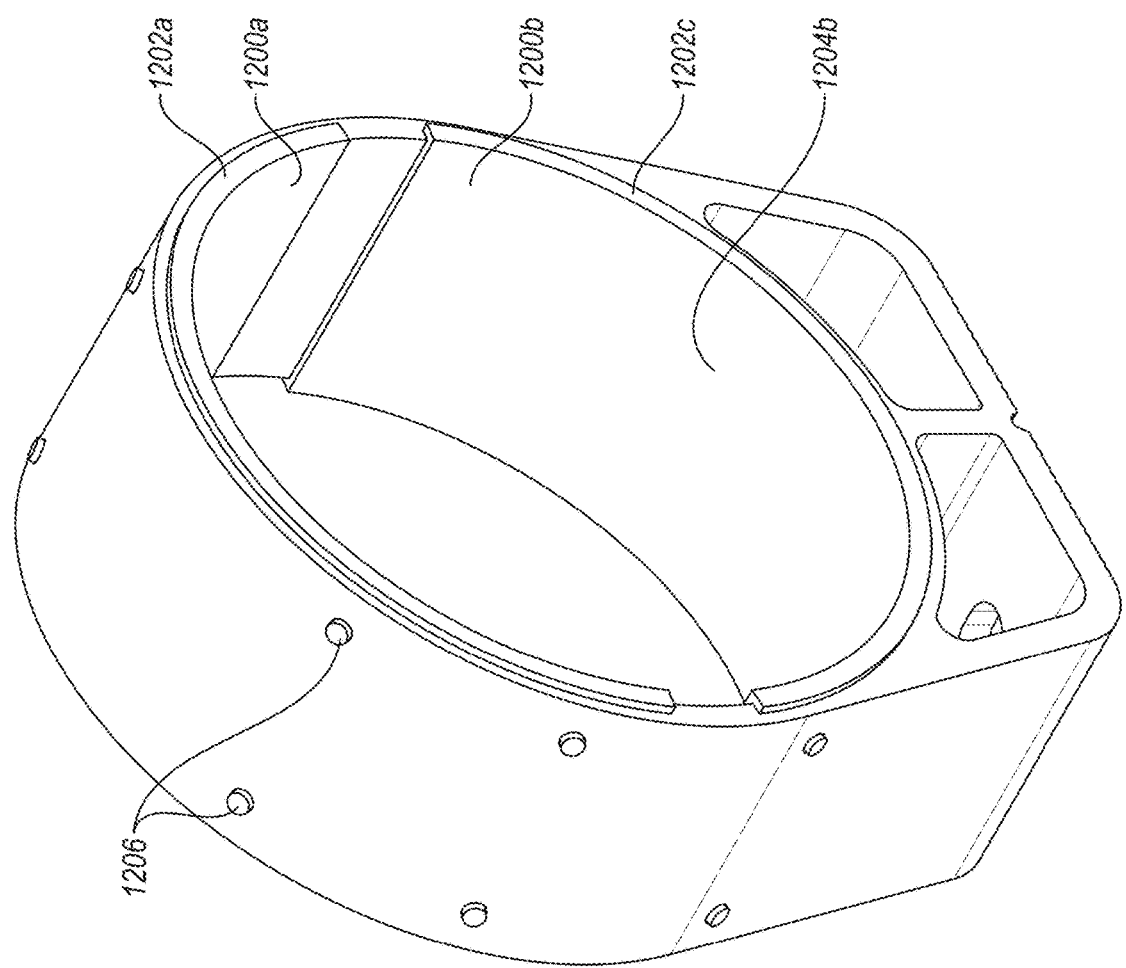

FIGS. 12A-12D illustrate the torque tube interface 1150 shown in FIG. 11, in accordance with one or more embodiments of the present disclosure. Specifically, FIG. 12A illustrates an isometric view of the bearing housing 1152, FIG. 12B illustrates an isometric view of the rotating bearing 1154, FIG. 12C illustrates an isometric view of the wear guards 1200*a* and 1200*b*, and FIG. 12D illustrates an isometric view of the bearing housing 1152 with the wear guards 1200*a* and 1200*b* installed.

As can be seen in FIG. 12A, the bearing housing 1152 of the torque tube interface 1150 edges 1166*a* and 1166*b* that define the axial sides of the bearing housing 1152. In some embodiments, the edges 1166*a*, and 1166*b* may be machined edges, stamped edges, molded edges, etc. and may be formed in any number of different ways. For example, the edges 1166*a*, and 1166*b* may have a sharp, fillet, chamfer, or another type of edge. Regardless of the type of edge or how it is formed, the edges 1166*a*, and 1166*b* may have sharp corners, burrs, or other features that may, over time, cause damage to an opposing surface. In some embodiments, the surface area of an interface between two components may simply be too small for the amount of pressure applied and result in a contact load that is too high for the materials. The bearing housing 1152 also includes a plurality of holes 1168.

FIG. 12B illustrates the rotating bearing 1154 of torque tube interface 1150. The rotating bearing 1154 may have a bifurcated construction that includes two separate components, an upper component 1156*a* and a lower component 1156*b*. The upper component 1156*a* may include lip portions 1170*a* and 1170*c*, and the lower component 1156*b* may include lip portions 1170*b* and 1170*d*. The lip portions 1170*a* and 1170*b* may surround all or part of a first axial side of the bearing 1154. The lip portions 1170*c* and 1170*d* may surround all or part of an opposing second axial side of the bearing 1154.

The lip portions 1170*a*, 1170*b*, 1170*c*, and 1170*d* may be configured to interface with one or more of the edges 1166*a* and 1166*b* of the bearing housing 1152 to prevent axial movement of the rotating bearing 1154 within the bearing housing 1152. For example, lip portions 1170*a* and 1170*b* of rotating bearing 1154 may be configured to interface with the edge 1166*a* of the bearing housing 1152. Lip portions 1170*c* and 1170*d* of rotating bearing 1154 may be configured to interface with the edge 1166*b*.

FIG. 12C illustrates the wear guards 1200*a* and 1200*b* of torque tube interface 1150. Similar to the bearing housing 1152 and rotating bearing 1154, the wear guards 1200*a* and 1200*b* may be constructed from any suitable material including but not limited to metal, plastic, a composite, or some combination of materials. One or more of the outer surfaces of the wear guards 1200*a* and 1200*b* may be smooth controlled surfaces that are configured to minimize wear with opposing surfaces. For example, the wear guards 1200*a* and 1200*b* include side portions 1202*a*, 1202*b*, 1202*c*, and 1202*d* that have smooth controlled surfaces that are configured to minimize wear with opposing surfaces. The wear guards 1200*a* and 1200*b* also include spanning portions 1204*a* and 1204*b*. The spanning portion 1204*a* spans a distance between and connects the side portions 1202*a* and 1202*b*. The spanning portion 1204*b* spans a distance and connects the side portions 1202*c* and 1202*d*.

Wear guards 1200*a* and 1200*b* also provide a barrier between at least a portion of an outer surface of rotating bearing 1154 and at least a portion of an interior surface of the bearing housing 1152. Specifically, spanning portions 1204*a* and 1204*b* protect against wear caused between an outer surface of the rotating bearing 1154 and an interior surface of the bearing housing 1152. The wear caused between an outer surface of the rotating bearing 1154 and an interior surface of the bearing housing 1152 may be caused by lateral loading that is applied to the bearing by the torque tube.

The wear guards 1200*a* and 1200*b* further include retention bars 1206 that are configured to align with the holes 1168 in the bearing housing 1152 to help retain the wear guards 1200*a* and 1200*b* in place. The wear guards 1200*a* and 1200*b* are installed on the bearing housing 1152 by inserting the retention bars 1206 into the corresponding holes 1168. Once installed, the retention bars 1206 may be heat staked within the holes 1168 in order to ensure the retention bars 1206 remain within the holes 1168.

For example, as can be seen in FIG. 12D, the wear guards 1200*a* and 1200*b* have been installed on bearing housing 11252. The spanning portions 1204*a* and 1204*b* are positioned on interior surfaces of the bearing housing 1152 and the retention bars 1206 are positioned within the holes 1168. The wear guards 1200*a* and 1200*b* are configured to be positioned between one or more of the interfaces between the bearing housing 1152 and the rotating bearing 1154. For example, as can be seen in FIG. 12D, the wear guard 1200*a* covers portions of edges 1166*a* and 1166*b* of the bearing housing 1152. The wear guard 1200*b* covers portions of edges 1166*a* and 1166*b* of the bearing housing 1152 as well.

In some embodiments, the wear guards 1200*a* and 1200*b* may remain stationary relative to the bearing housing 1152. When the rotating bearing 1154 is positioned within the bearing housing 1152, the lip portions 1270*a*, 1270*b*, 1270*c*, and 1270*d* do not directly interface with the edges 1166*a* and 1166*b*, regardless of the rotational configuration of the rotating bearing 1154 within the bearing housing 1152. Rather, the lip portions 1270*a*, 1270*b*, 1270*c* and 1270*d* interface with and rub against the side portions 1202*a*, 1202*c*, 1202*b*, and 1202*d*, respectively, of the wear guards 1200*a* and 1200*b*. By eliminating a direct interface between the lip portions 1270*a*, 1270*b*, 1270*c*, and 1270*d* and the edges 1166*a* and 1166*b*, wear and damage that may be caused by the edges 1166*a* and 1166*b* to the lip portions 1170*a*, 1170*b*, 1170*c*, and 1170*d* or by the lip portions 1170*a*, 1170*b*, 1170*c*, and 1170*d* to the edges 1166*a* and 1166*b* can be avoided or reduced.

With the variations illustrated herein, it will be apparent that any of the feature included herein are optional and may be combined in any way. Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A torque tube interface comprising:
a bearing configured to be coupled to a torque tube;
a bearing housing coupled to the bearing to allow at least some rotational movement of the bearing within the bearing housing, wherein:
the bearing housing has a terminating edge where an outer surface of the bearing housing that faces away from the bearing and an inner surface of the bearing housing that faces toward the bearing end, and
the terminating edge is at an interface between the bearing and the bearing housing; and
a wear guard having a cross sectional C shape, wherein a top portion of the wear guard is positioned on at least a portion of the outer surface of the bearing housing, a bottom portion of the wear guard is positioned between at least a portion of the inner surface of the bearing housing and an outer surface of the bearing, and a side portion of the wear guard is positioned at the interface between the bearing and the terminating edge of the bearing housing.

2. The torque tube interface of claim 1, wherein the torque tube interface is part of a solar tracking system.

3. The torque tube interface of claim 1, wherein the wear guard is coupled to the bearing housing.

4. The torque tube interface of claim 3, wherein the wear guard is secured to the bearing housing through a snap or friction attachment.

5. The torque tube interface of claim 3, wherein:
the bearing housing includes a hole,
the wear guard includes a retention bar, and
to couple the wear guard to the bearing housing, the retention bar is inserted into the hole.

6. The torque tube interface of claim 1, wherein:
the bearing includes a stop tab,
the bearing housing has a slot that defines an enclosed aperture through which at least a portion of the stop tab extends, the slot being defined, at least in part, by the terminating edge, and
the wear guard is positioned at the interface between the bearing and the terminating edge that defines, at least in part, the slot.

7. The torque tube interface of claim 1, wherein:
the bearing housing has a first axial side that is defined, at least in part, by the terminating edge, and
the wear guard is positioned at the interface between the bearing and the terminating edge that defines, at least in part, the first axial side of the bearing housing.

8. The torque tube interface of claim 1, wherein the bearing housing is made from metal and the bearing is made from plastic.

9. A torque tube interface comprising:
a bearing configured to be coupled to a torque tube, the bearing including a stop tab;
a bearing housing coupled to the bearing such that axial movement of the bearing within the bearing housing is substantially restricted but at least some rotational movement of the bearing within the bearing housing is permitted, wherein the stop tab limits an amount of rotational movement of the bearing within the bearing housing and the bearing housing includes a slot that defines an enclosed aperture through which a portion of the stop tab extends; and
a wear guard having a cross sectional C shape, wherein a top portion of the wear guard is positioned on an outer surface of the bearing housing, a bottom portion of the wear guard is positioned between an inner surface of the bearing housing and an outer surface of the bearing, and a side portion of the wear guard is positioned at an interface between the bearing and a terminating edge of the bearing housing that defines the slot.

10. The torque tube interface of claim 9, wherein the torque tube interface is part of a solar tracking system.

11. The torque tube interface of claim 9, wherein the wear guard is secured to the bearing housing through a snap or friction attachment.

12. The torque tube interface of claim 9, wherein:
the bearing housing includes a hole,
the wear guard includes a retention bar, and
the wear guard is coupled to the bearing housing by inserting the wear guard retention bar into the bearing housing hole.

* * * * *